(12) United States Patent
Su et al.

(10) Patent No.: US 8,264,407 B2
(45) Date of Patent: Sep. 11, 2012

(54) TRANSMITTER BEAMFORMING STEERING MATRIX PROCESSING AND STORAGE

(75) Inventors: Chi-Lin Su, Hsinchu (TW); Bemini Hennadige Janath Peiris, Sunnyvale, CA (US); Ning Zhang, Saratoga, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 5 days.

(21) Appl. No.: 12/901,926

(22) Filed: Oct. 11, 2010

(65) Prior Publication Data

US 2012/0014415 A1    Jan. 19, 2012

Related U.S. Application Data

(63) Continuation-in-part of application No. 12/388,688, filed on Feb. 19, 2009, now abandoned.

(51) Int. Cl.
     *H01Q 3/00*      (2006.01)
(52) U.S. Cl. ........................... 342/373; 342/372; 342/377
(58) Field of Classification Search .................. 342/372, 342/373, 377, 442
See application file for complete search history.

(56) References Cited

U.S. PATENT DOCUMENTS

| | | | |
|---|---|---|---|
| 5,172,343 A | 12/1992 | Odonnell | |
| 6,785,520 B2 | 8/2004 | Sugar et al. | |
| 7,385,914 B2 | 6/2008 | Choi et al. | |
| 7,561,632 B1 | 7/2009 | Zelst et al. | |
| 7,676,007 B1 | 3/2010 | Choi et al. | |
| 7,787,554 B1 | 8/2010 | Nabar et al. | |
| 7,822,128 B2 | 10/2010 | Maltsev et al. | |
| 2008/0095268 A1 | 4/2008 | Aldana | |
| 2008/0102760 A1 | 5/2008 | McConnell et al. | |
| 2009/0252251 A1 | 10/2009 | Tosato et al. | |
| 2010/0056059 A1 | 3/2010 | Lakshmanan et al. | |
| 2012/0062421 A1 | 3/2012 | Su et al. | |

FOREIGN PATENT DOCUMENTS

WO    WO2012033937    3/2012

OTHER PUBLICATIONS

International Search Report and Written Opinion—PCT/US2011/050864—ISA/EPO—Dec. 30, 2011, 7 pages.
International Search Report and Written Opinion—PCT/US2011/055756—ISA/EPO—Jan. 26, 2012, 10 pages.
U.S. Appl. No. 12/388,683—Final Office Action—Jan. 20, 2012, 12 pages.
U.S. Appl. No. 12/939,769, filed Nov. 4, 2010, Su, Chi-Lin.
"U.S. Appl. No. 12/388,683 Office Action", Jul. 25, 2011, 13 pages.

(Continued)

*Primary Examiner* — Dao Phan
(74) *Attorney, Agent, or Firm* — DeLizio Gilliam, PLLC

(57) ABSTRACT

A mechanism for processing beamforming steering matrices in a transceiver system. A plurality of beamforming steering matrices associated with a plurality of subcarriers of an RF signal received at the transceiver system are generated. The beamforming steering matrices are compressed and stored. The beamforming steering matrices may also be grouped or sub-sampled prior to being stored. The beamforming steering matrices are decompressed and ungrouped before being applied to data to be transmitted. Prior to ungrouping the beamforming steering matrices, a phase difference between corresponding beamforming steering vectors of consecutive beamforming steering matrices is determined. Phase rotation is performed on the corresponding beamforming steering vectors based on the determined phase difference associated with the corresponding beamforming steering vectors to improve phase continuity between consecutive beamforming steering matrices.

22 Claims, 12 Drawing Sheets

OTHER PUBLICATIONS

U.S. Appl. No. 12/388,683, filed Feb. 19, 2009, Su, Chi-Lin et al.
U.S. Appl. No. 12/388,688, filed Feb. 19, 2009, Su, Chi-Lin et al.
U.S. Appl. No. 61/381,439, filed Sep. 9, 2010, Su, Chi-Lin et al.
"U.S. Appl. No. 12/388,688 Office Action", Apr. 28, 2010, 5 pages.
Spencer, Quentin H. et al., "Zero-Forcing Methods for Downlink Spatial Multiplexing in Multiuser MIMO Channels", *IEEE Transactions on Signal Processing*, vol. 52, No. 2, Feb. 2004, 11 pages.
U.S. Appl. No. 12/388,683 Office Action, May 30, 2012, 16 pages.

TRANSMITTER BEAMFORMING STEERING MATRIX PROCESSING AND STORAGE

BACKGROUND

Embodiments of the inventive subject matter generally relate to the field of wireless communication, and more particularly, to techniques for beamforming steering matrix processing and storage.

In a multiple-input multiple-output (MIMO) system, a transmitter uses multiple transmit antennas to transmit data to a receiver with multiple receive antennas to improve communication performance and data throughput. Communication performance of a MIMO system can be further improved using beamforming techniques. Beamforming improves the directionality of the multiple transmit antennas. For beamforming, one or more steering matrices are applied to data to be transmitted to ensure that signals transmitted from the multiple transmit antennas arrive constructively at a specified receiver. Beamforming also reduces interference to other receivers since the transmitted signals arrive destructively at receivers other than the specified receiver.

SUMMARY

Embodiments include a method for performing beamforming steering matrix processing and storage. In one embodiment, the method comprises decompressing a plurality of stored beamforming steering matrices at a transceiver system. The beamforming steering matrices are associated with a plurality of subcarriers of an RF signal received at the transceiver system. A phase difference between corresponding beamforming steering vectors of each pair of consecutive beamforming steering matrices is determined at the transceiver system. Phase rotation is performed, at the transceiver system, on the corresponding beamforming steering vectors of each pair of consecutive beamforming steering matrices based on the determined phase difference associated with the corresponding beamforming steering vectors of each pair of consecutive steering matrices to improve phase continuity between consecutive beamforming steering matrices. The beamforming steering matrices are interpolated, at the transceiver system, to ungroup the beamforming steering matrices and applied to data to be transmitted by the transceiver system to generate beamformed data streams.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to multiple-input multiple-output (MIMO) orthogonal frequency division multiplexing (OFDM), other suitable modulation and coding scheme may be used. The described techniques may also be applied to systems with a single transmit chain and/or a single receive chain. Also, although examples refer to techniques for wireless communication, embodiments may be used in a variety of communication systems. In other instances, well-known instruction instances, protocols, structures, and techniques have not been shown in detail in order not to obfuscate the description.

Beamforming is a spatial diversity technique typically used to improve directionality of a signal transmitted by a MIMO system. In a MIMO-OFDM system, OFDM signals transmitted by multiple antennas comprise a plurality of OFDM subcarriers. Each OFDM subcarrier is associated with one or more steering matrices. In some embodiments, the steering matrices associated with the subcarriers are compressed and grouped to allow for convenient storage and retrieval of the steering matrices. Determining and ensuring that corresponding steering vectors (i.e., columns of a steering matrix) of consecutive steering matrices are phase-continuous in the frequency domain, e.g., before the steering matrices are applied to data to be transmitted, can lead to a reduction in steering matrix interpolation errors. The phases of the steering vectors that exhibit phase discontinuity are corrected to help ensure that the appropriate steering matrices are applied to the data to be transmitted. In ensuring phase continuity between the corresponding steering vectors of consecutive steering matrices, directionality of the transmitted signals can be preserved. This can improve the performance of the communication system, improve data throughput, and reduce destructive interference at the receiver.

Figure 1:
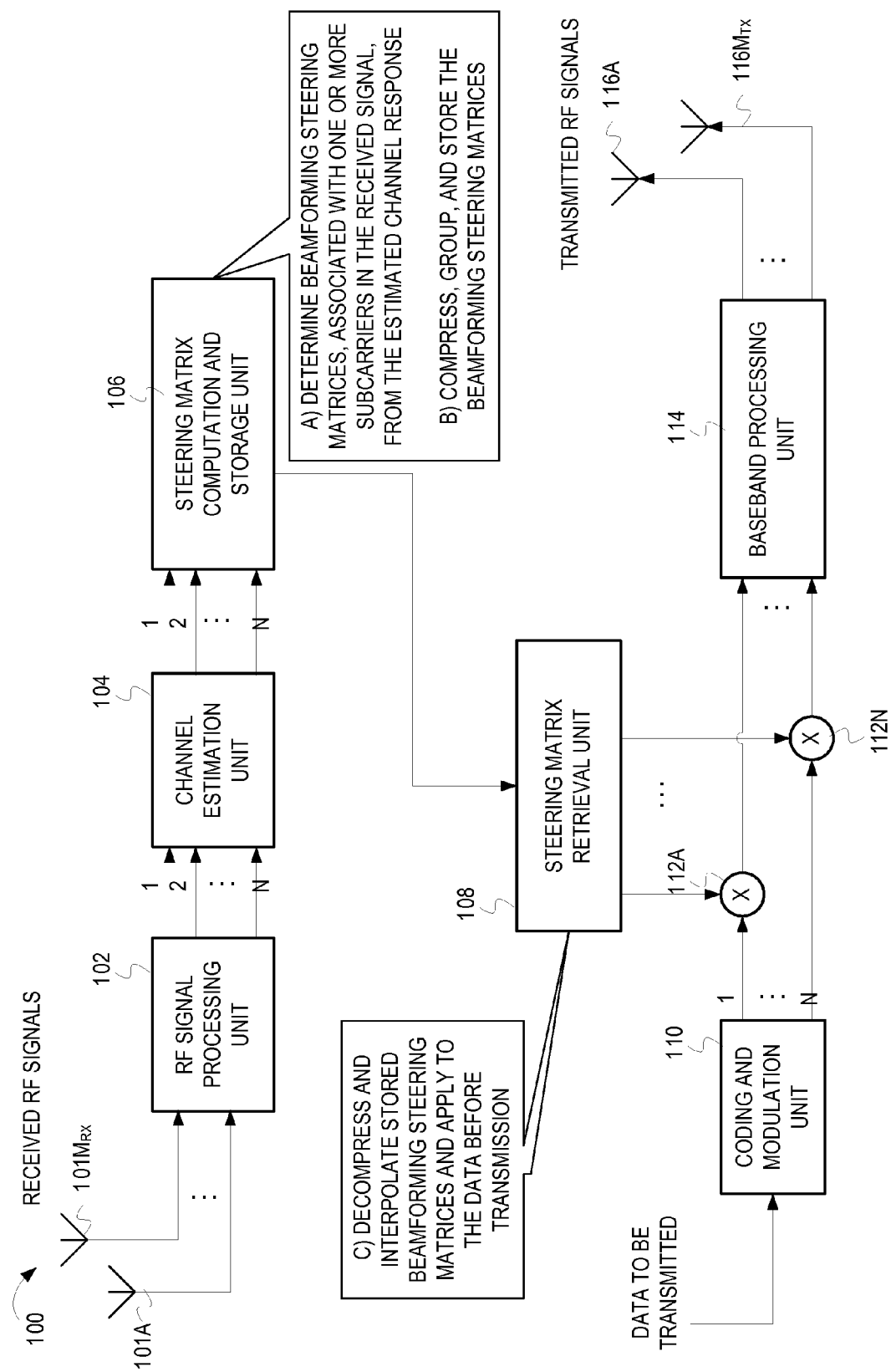
FIG. 1 is a block diagram of one embodiment of a transceiver configured to determine and apply steering matrices for beamforming.

FIG. 1 is a block diagram of one embodiment of a transceiver 100 configured to determine and apply steering matrices for beamforming. The transceiver 100 depicted in FIG. 1 comprises $M_{RX}$ receive chains and $M_{TX}$ transmit chains. Antennas 101A ... 101 $M_{RX}$ receive RF signals. The antennas are coupled with an RF signal processing unit 102. The RF signal processing unit 102 coupled with a channel estimation unit 104. The channel estimation unit 104 is coupled with a steering matrix computation and storage unit 106, which in turn is coupled with a steering matrix retrieval unit 108. A coding and modulation unit 110 receives data to be transmitted and is coupled with N multipliers 112A . . . 112N. The steering matrix retrieval unit 108 is also coupled with the N multipliers 112A . . . 112N. The outputs of the N multipliers 112A . . . 112N are provided to a baseband processing unit 114. $M_{TX}$ transmit antennas 116A . . . 116M$_{TX}$ transmit the $M_{TX}$ outputs of the baseband processing unit 114.

The receive antennas 101A . . . 101M$_{RX}$ receive the RF signals and provide the received RF signals to the RF signal processing unit 102. The RF signal processing unit 102 can comprise functionality to implement packet detection, signal amplification, filtering, analog to digital (A/D) conversion, conversion from time domain to frequency domain, etc. Typically, each of the $M_{RX}$ receive chains comprise distinct amplifiers, mixers, Fast Fourier Transforms (FFT) units, A/D converters, etc. The RF signal processing unit 102 can also comprise a demultiplexing unit (not shown). In a MIMO-OFDM system, the data from the $M_{RX}$ receive chains can be converted from time domain to frequency domain (e.g., by the FFT units) and N independent data streams corresponding to N independent OFDM sub-carriers can be generated. The N independent data streams are provided to a channel estimation unit 104. The channel estimation unit 104 uses training symbols in the received data streams to determine a channel matrix (comprising channel estimates) corresponding to each OFDM sub-carrier. In some implementations, a single channel matrix may be determined from the received data streams. The channel estimation unit may implement additional functionality to decompose the single channel matrix into channel matrices for each of the N OFDM sub carriers.

At stage A, the steering matrix computation and storage unit 106 determines one or more steering matrices associated with the N OFDM sub-carriers by performing singular value decomposition (SVD) on the estimated channel matrices (determined by the channel estimation unit 104). Thus, for the N OFDM sub-carriers there are at least N steering matrices. The number of rows and columns in each of the N steering matrices depends on the number of space-time streams. For N steering matrices, with an order of $M_{TX} \times M_{TX}$, the total number of elements to be stored is $M_{TX} \times M_{TX} \times N$. At stage B, the steering matrix computation and storage unit 106 compresses, groups, and stores the determined steering matrices to minimize the amount of memory required to store the N steering matrices. Steering matrix compression takes advantage of the fact that the columns of the steering matrices are inter-dependent and can be represented using fewer than $M_{TX} \times M_{TX} \times N$ independent parameters. For example, as defined in the IEEE 802.11n, steering matrices can be compressed by representing a steering matrix by a pair of angles. To group the steering matrices, the steering matrix computation and storage unit 106 takes advantage of the interdependency between steering matrices of different subcarriers. The steering matrix computation and storage unit 106 sub-samples the OFDM subcarriers and retains compressed steering matrices associated with the sub-sampled subcarriers. For example, a grouping factor of 2 implies that the compressed steering matrix associated with every other sub-carrier is retained. The other steering matrices may be discarded. It is noted, however, that in other examples a different grouping factor may be utilized, e.g., a grouping factor of 4. Compressing and grouping the steering matrices can reduce the amount of memory required to store the steering matrices.

After the steering matrices are compressed, grouped, and stored, the transceiver 100 may apply the steering matrices to signals to be transmitted. The coding and modulation unit 110 receives a stream of data (e.g., in the form of information bits) to be transmitted, splits the data stream into N independent data streams (corresponding to N independent sub-carriers), and encodes the data streams. At stage C, the steering matrix retrieval unit 108 retrieves and decompresses the stored steering matrices. The steering matrix retrieval unit 108 can also perform phase rotation to ensure that there is phase continuity across the same column of steering matrices (i.e., steering vectors) associated with consecutive sub-carriers ("corresponding steering vectors of the consecutive steering matrices"), and interpolation operations to ungroup the decompressed steering matrices. Multipliers 112A . . . 112N apply the N retrieved steering matrices to the corresponding data streams to generate $M_{TX} \times N$ beamformed data streams. A baseband processing unit 114 receives the $M_{TX} \times N$ beamformed data streams. The baseband processing unit 114 can comprise inverse Fast Fourier Transform (IFFT) units 114 (which convert N subcarriers into time domain), modulators, amplifiers, etc. in each of the $M_{TX}$ transmit chains. The baseband processing unit 114 processes the $M_{TX}$ data streams to generate $M_{TX}$ RF signals. Antennas 116A . . . 116M$_{TX}$ transmit the $M_{TX}$ RF signals.

Figure 2A:
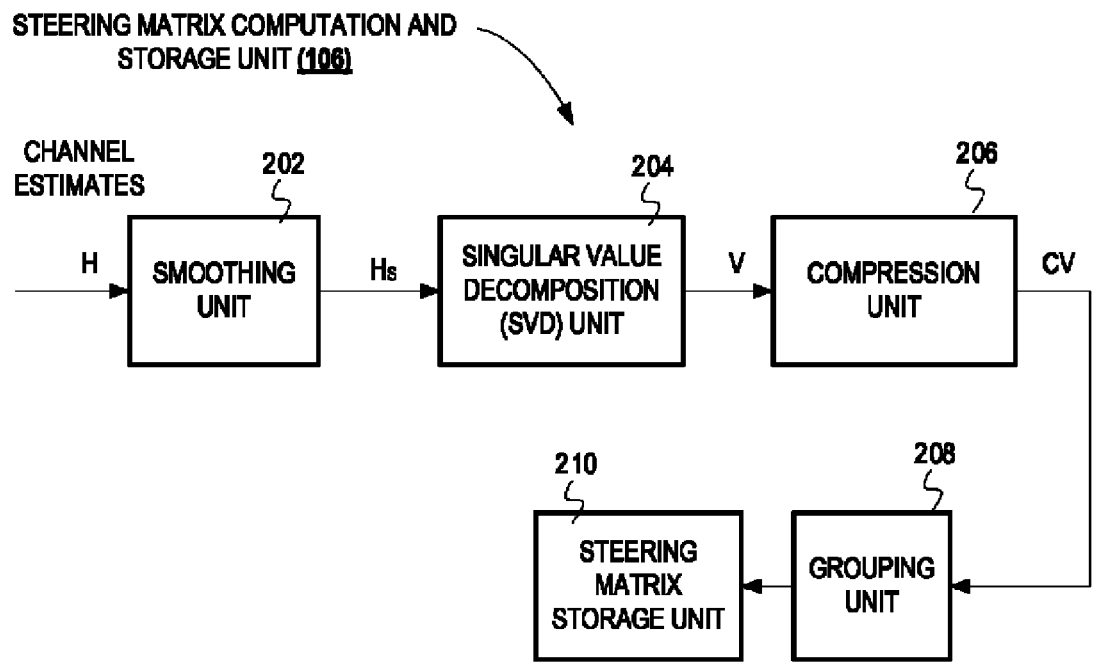
FIG. 2A is a block diagram of one embodiment of the steering matrix computation and storage unit.

FIG. 2A is a block diagram of one embodiment of the steering matrix computation and storage unit 106 of FIG. 1. The steering matrix computation and storage unit 106 comprises a smoothing unit 202, a singular value decomposition (SVD) unit 204, a compression unit 206, a grouping unit 208, and a steering matrix storage unit 210.

The smoothing unit 202 receives channel estimates (H), e.g., from the channel estimation unit 104 of FIG. 1. As described earlier, the channel estimation unit generates a different channel matrix for each OFDM subcarrier. Also, each OFDM subcarrier is associated with a distinct steering matrix. The smoothing unit 202 is a filter with a response tailored to minimize the effects of noise on the channel estimates. In some implementations, a moving average filter may be used as a smoothing filter. In another implementation, the smoothing filter may be any suitable low pass filter. The smoothed channel estimates are represented by $H_S$. The singular value decomposition (SVD) unit 204 decomposes the smoothed channel estimates ($H_S$) to generate one or more steering matrices (V) corresponding to each OFDM subcarrier.

The compression unit 206 receives the steering matrices associated with each OFDM subcarrier and compresses the steering matrices (V). In some implementation, the compression unit 206 may represent a steering matrix by a pair of Givens angles (described by the IEEE 802.11n). The grouping unit 208 receives the compressed steering matrices and retains a pre-defined number of steering matrices. The number of retained steering matrices may be determined based on the compression factor, available storage, permissible overhead, subcarrier error rate, etc. The steering matrix storage unit 210 then stores the grouped and compressed steering matrices.

Figure 2B:
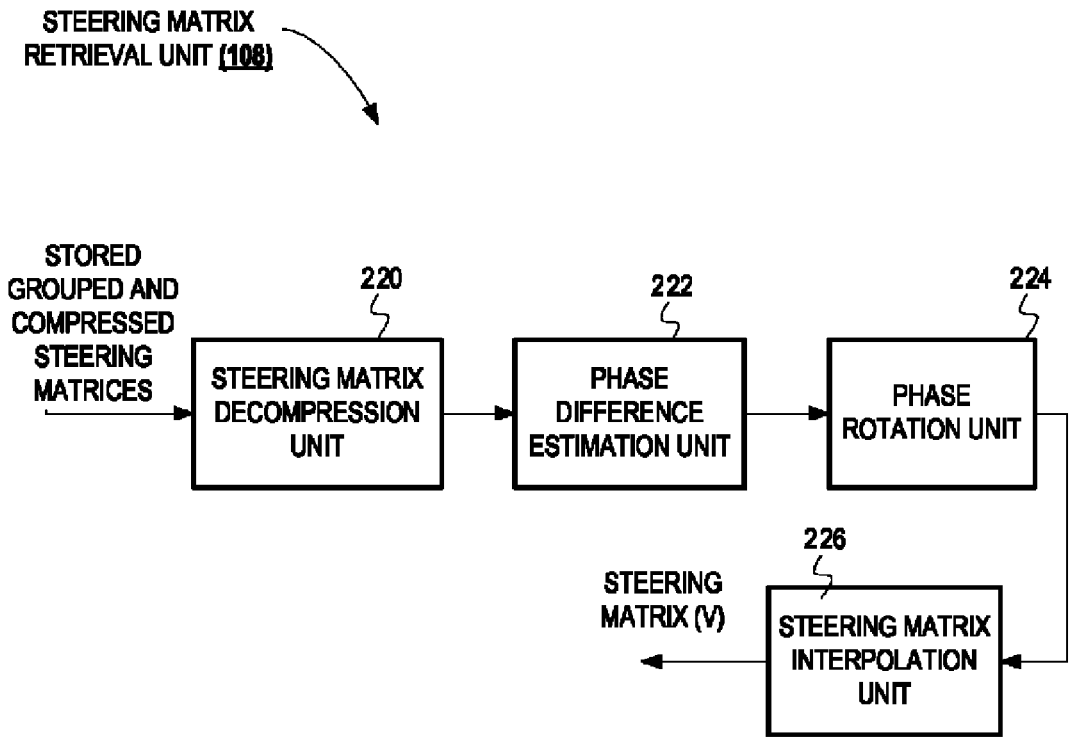
FIG. 2B is a block diagram of one embodiment of the steering matrix retrieval unit.

FIG. 2B is a block diagram of one embodiment of the steering matrix retrieval unit 108 of FIG. 1. FIG. 2B comprises a steering matrix decompression unit 220, a phase difference estimation unit 222, a phase rotation unit 224, and a steering matrix interpolation unit 226.

The steering matrix decompression unit 220 receives the grouped and compressed steering matrices, e.g., that were stored in the steering matrix storage unit 210, and decompresses the steering matrices. For example, the steering matrix decompression unit 220 may implement functionality to regenerate the steering matrices from the Givens angles.

Figure 5A:
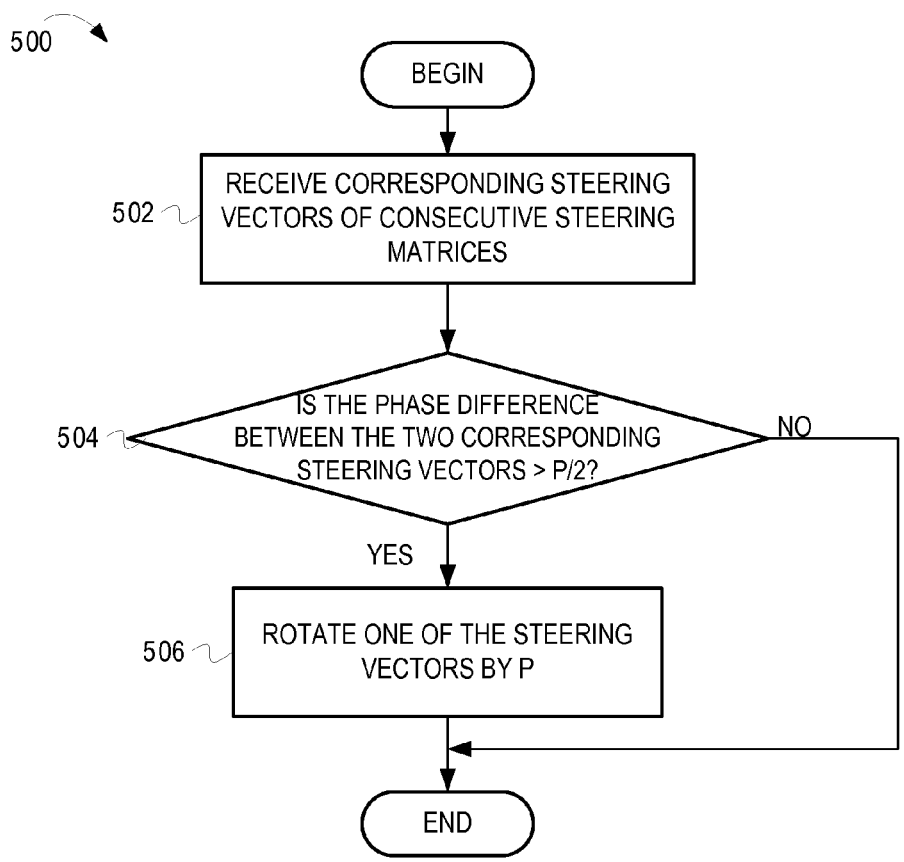
FIG. 5A is a flow diagram illustrating example operations for phase rotation by a fixed phase offset.

Because the steering matrices generated by the SVD unit 204 are not unique (i.e., a channel matrix can have multiple SVD representations), the phase across the decompressed steering matrices may not be continuous in the frequency domain. Phase continuity across the corresponding steering vectors of consecutive steering matrices can ensure better performance at a receiver. Phase continuity across the corresponding steering vectors of consecutive steering matrices can also lead to fewer errors during steering matrix interpolation. The phase difference estimation unit 222 determines whether there is a phase mismatch between the corresponding steering vectors of consecutive steering matrices. For example, a first sub-carrier may be associated with a first steering matrix and a second consecutive sub-carrier may be associated with a second steering matrix. The phase difference estimation unit 222 can determine whether there is a phase mismatch between a first steering vector of the first steering matrix and a corresponding first steering vector associated with the second steering matrix. If the phase difference is greater than $$\frac{\pi}{2},$$

the phase rotation unit 224 rotates one of the steering vectors by $\pi$ (see FIG. 5A). In some implementations, the phase difference estimation unit 222 can cross correlate the corresponding steering vectors of consecutive steering matrices to determine a more precise phase difference (see FIG. 6). The phase rotation unit 224 can shift one of the steering vectors by the determined phase difference. Operations for phase difference estimation and phase rotation are performed for each set of consecutive steering matrices associated with all the sub-carriers. In one example, after the phase difference between corresponding steering vectors of a first and a second steering matrices is estimated and corrected, the phase difference between corresponding steering vectors of the second and the third steering matrices is estimated and corrected, etc.

After the phase rotation unit 224 rotates one or more corresponding steering vectors of consecutive steering matrices for phase continuity, the steering matrix interpolation unit 226 interpolates the decompressed steering matrices to obtain steering matrices associated with all sub-carriers. As described earlier, grouping operations can dictate that only a subset of the steering matrices be stored. The steering matrix interpolation unit 226 can use any suitable interpolation technique (e.g., linear interpolation, spline interpolation, etc.) to retrieve the steering matrices that were discarded during the grouping process. For example, the steering matrix interpolation unit 226 may determine the Givens angles associated with the discarded steering matrices from the Givens angles associated with the stored steering matrices. The steering matrix interpolation unit 226 may also comprise a smoothing filter to minimize the effects of noise on the steering matrices.

Figure 3A:
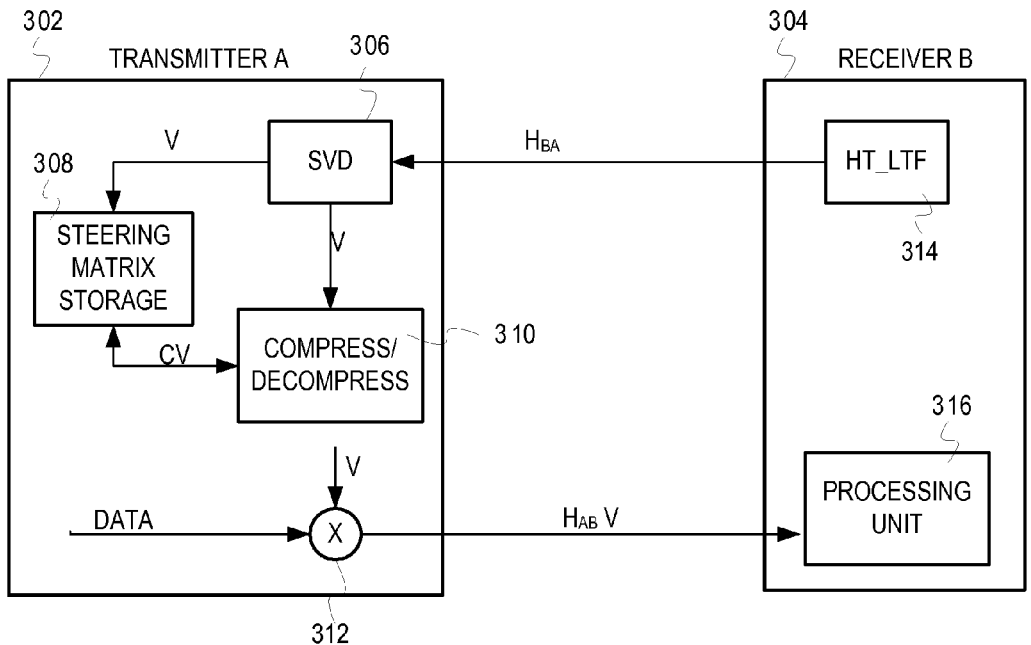
FIG. 3A is a example block diagram illustrating an example mechanism for steering matrix generation in implicit mode.

FIG. 3A is a block diagram illustrating an example mechanism for steering matrix generation in implicit mode. The implicit mode exploits the reciprocity of channel between a beamformer (e.g., transmitter A 302) and a beamformee (e.g., receiver B 304). In other words, it is assumed that the channel between the transmitter 302 and the receiver 304 ($H_{AB}$) is the same (e.g., has the same characteristics) as the channel between the receiver 304 and the transmitter 302 ($H_{BA}$). The transmitter 302 and the receiver 304 depicted in FIG. 3A may be part of different distinct transceivers and may be at different physical locations. The transmitter 302 and the receiver 304 communicate via a communication channel using wireless communication techniques. The transmitter 302 comprises a steering matrix storage unit 308 coupled with a compression/decompression unit 310 and a SVD unit 306. Additionally, the SVD unit 306 is also coupled with the compression/decompression unit 310. The transmitter also comprises a multiplier 312, which applies the steering matrices to the data to be transmitted. The receiver 304 comprises a processing unit 316.

In the implicit mode, the transmitter 302 estimates channel information from training symbols transmitted by the receiver 304 and computes steering matrices. The receiver 304 transmits training symbols 314 along a communication channel $H_{BA}$ to the transmitter 302. Although, in FIG. 3A, the training symbols are depicted as high throughput long training fields (HT_LTF), the number, type, and size of training fields transmitted may vary depending on the communication standards employed. The transmitter 302 may include additional processing units (not shown) to detect the incoming packet, retrieve the training fields 314, and estimate a channel response. In the implicit mode, Eq. 1 represents the channel estimated ($H_{est}$) at the transmitter 302. The SVD unit 306 determines the steering matrices ($V_{AB}$), associated with the one or more sub-carriers, from the estimated channel response ($H_{est}$). The steering matrices ($V_{AB}$) are determined in accordance with Eq. 2.

$$H_{est} = (H_{BA})^T = H_{AB} \qquad \text{Eq. 1}$$

$$V_{AB} = \text{SVD}(H_{est}) = \text{SVD}(H_{AB}) \qquad \text{Eq. 2}$$

The compression/decompression unit 310 receives the steering matrices from the SVD unit 306 and compresses the steering matrices ($V_{AB}$). In some implementations, the transmitter 302 may also comprise a grouping unit (not shown) to group the compressed steering matrices by storing a subset of the determined steering matrices. The steering matrix storage unit 308 stores the steering matrices in any one or more of three formats—an uncompressed, ungrouped format (V), compressed steering matrices (CV), and grouped compressed steering matrices.

Before the transmitter 302 transmits any data, the steering matrix storage unit 308 retrieves the stored compressed steering matrices. The compression/decompression unit 310 decompresses the compressed steering matrices. In some implementations, if the matrices were grouped before storage, an interpolation unit may interpolate the decompressed matrices to retrieve the matrices discarded during the grouping process. Additionally, to ensure accurate ungrouping (i.e., interpolation) of the steering matrices, phase continuity across corresponding steering vectors of consecutive steering matrices associated with all the subcarriers may be established.

The multiplier 312 applies the steering matrices (V) to the data to be transmitted. The resultant data is then provided to one or more antennas for transmission over the communication channel ($H_{AB}$). The communication channel ($H_{AB}$) and the applied steering matrix ($V_{AB}$) influence the channel estimates determined at the receiver.

Figure 3B:
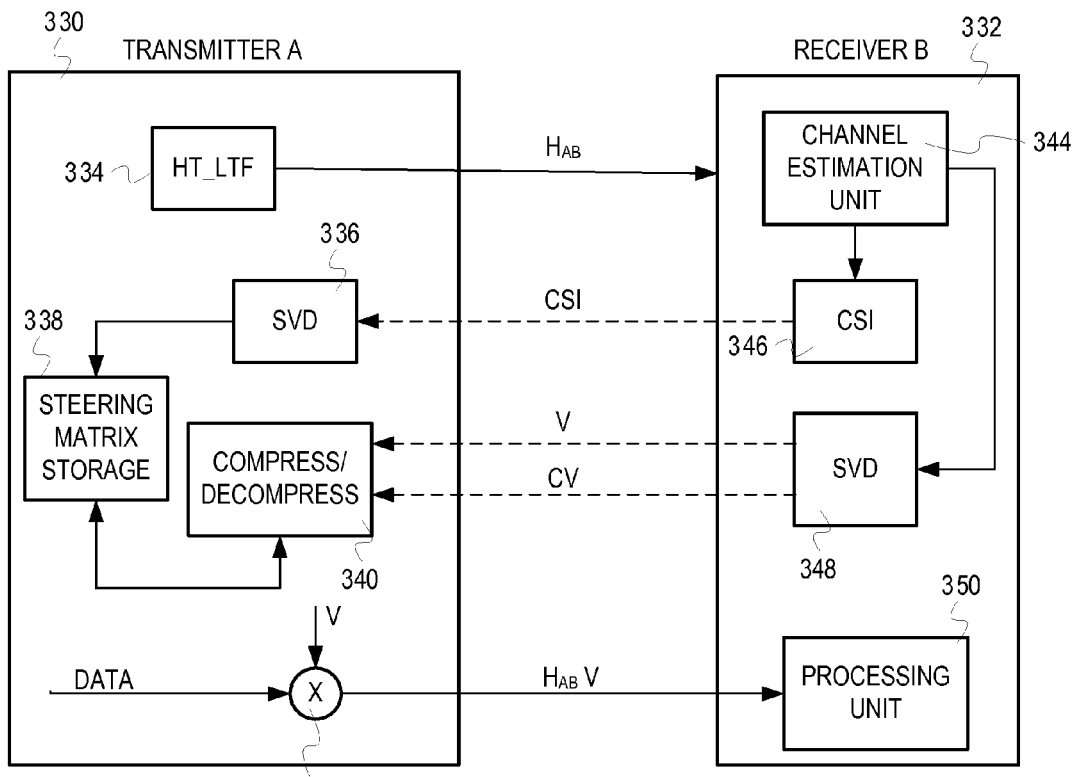
FIG. 3B is a example block diagram illustrating an example mechanism for steering matrix generation in explicit mode.

FIG. 3B is a block diagram illustrating an example mechanism for steering matrix generation in explicit mode. In the explicit mode, a beamformer (e.g., transmitter 330) receives channel information or steering matrices estimated by a beamformee (e.g., receiver 332). The transmitter 330 and the receiver 332 depicted in FIG. 3B may be part of different distinct transceivers and may be at different physical locations. The transmitter 330 comprises a steering matrix storage unit 338 coupled with a compression/decompression unit 340 and a SVD unit 336. The transmitter 330 also comprises a multiplier 342, which applies the steering matrices to data to be transmitted. The receiver 332 comprises a processing unit 350, which receives the transmitted data. The receiver 332 also comprises a channel estimation unit 344 coupled with a channel state indicator (CSI) unit 346 and an SVD unit 348.

The transmitter 330 transmits training symbols 334 along a communication channel $H_{AB}$ to the receiver 332. Although, in FIG. 3B, the training symbols are depicted as high throughput long training fields (HT_LTF), the number, type, and size of training fields transmitted may vary depending on the communication standards employed. The receiver 332 (or the processing unit 350) may implement functionality to detect the incoming packet, retrieve the training fields 334, and provide the retrieved training fields to the channel estimation unit 344. The channel estimation unit 344 estimates the channel response for one or more of the subcarriers that comprise the received signal. In the explicit mode, Eq. 3 represents the channel estimated at the receiver 332.

$$H_{est} = H_{AB} \qquad \text{Eq. 3}$$

The SVD unit 348 determines the steering matrices, associated with the one or more sub-carriers, from the estimated channel response. The steering matrices (V) are determined as described by Eq. 2.

The receiver 332 may also comprise a compression unit to compress the determined steering matrices. Depending on the capabilities of transmitter 330 and the receiver 332, the receiver 332 transmits any one or more of the channel state information (CSI) (e.g., channel estimates, covariance of channel estimates, etc.), ungrouped and uncompressed steering matrices (V), and the compressed steering matrices (CV), as shown by the dashed lines in FIG. 3B. It is noted that in some embodiments the receiver 332 may also transmit grouped steering matrices.

The compression/decompression unit 340, on the transmitter 330, compresses and stores the received the steering matrices (V). In some implementations, the transmitter 330 may also comprise a grouping unit (not shown) to group the compressed steering matrices (CV). The steering matrix storage unit 338 stores the steering matrices in any one or more of three formats—an uncompressed, ungrouped format (V), compressed steering matrices (CV), and grouped compressed steering matrices.

As described earlier, the compression/decompression unit 340 retrieves the steering matrices from the steering matrix storage unit 338, decompresses the compressed steering matrices, determines whether there is a phase discontinuity between corresponding steering vectors of consecutive steering matrices, and accordingly rotates the phases of the steering vectors to ensure continuity across steering matrices in the frequency domain. The compression/decompression unit 340 also interpolates the decompressed steering matrices to retrieve the steering matrices discarded during the grouping process. The multiplier 342 applies the steering matrices (V) to the data to be transmitted. The resultant data is the provided to one or more antennas for transmission over the communication channel ($H_{AB}$).

The depicted block diagrams (FIGS. 1-3B) are examples and should not be used to limit the scope of the embodiments. For example, although the Figures refer to an OFDM scenario with one steering matrix associated with each of the OFDM subcarriers, any suitable multiplexing and modulation technique (e.g., frequency division multiplexing) may also be used. The transmitter and/or the receiver depicted in the Figures may comprise one or more chains. The number of transmit chains may or may not differ from the number of receive chains. Although FIG. 1 depicts separate transmit and receive antennas, a single set of antennas may be used for both transmission and reception. Although FIGS. 3A and 3B depict a single multiplier, the number of multipliers may vary depending on the number of steering matrices and data streams. In some implementations, a single multiplier may successively operate on each data stream. Although FIGS. 3A and 3B depict the data being transmitted across a channel immediately after the steering matrices are applied, the transmitter may implement additional functionality such as data multiplexing, data modulation, signal amplification, etc.

Figure 4:
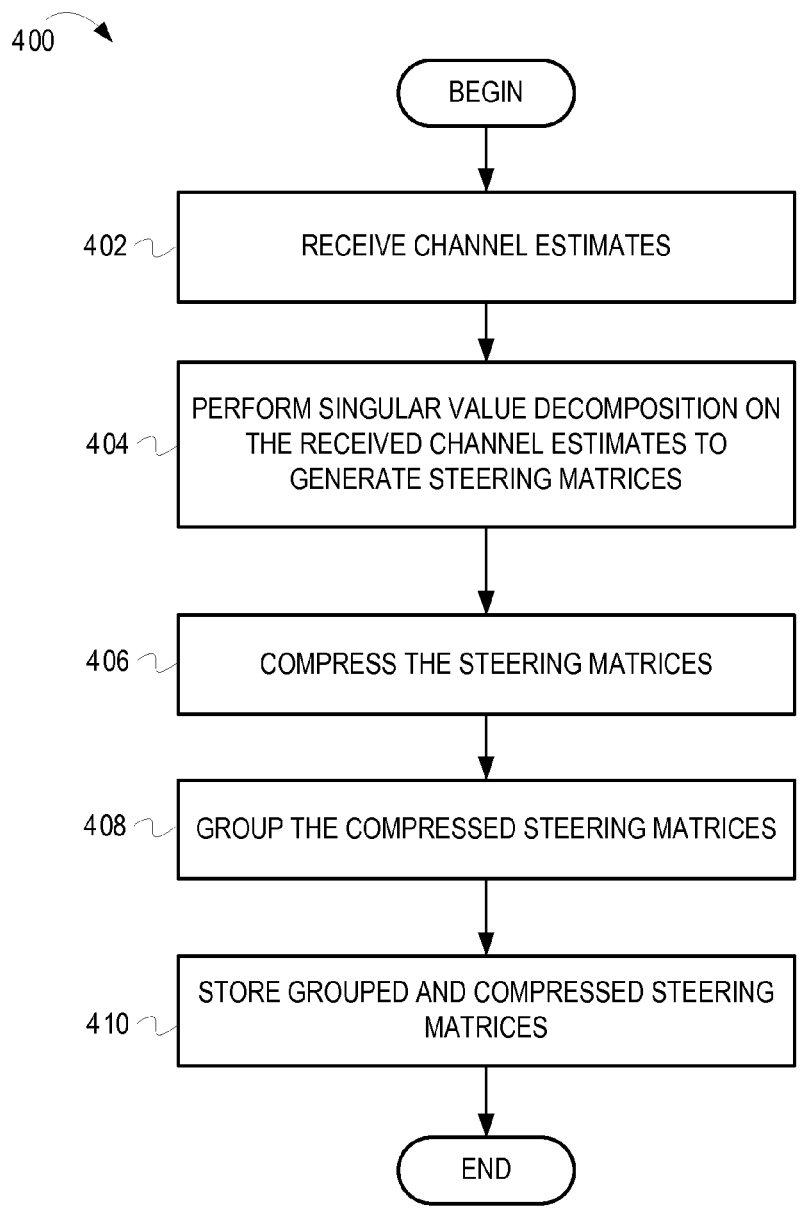
FIG. 4 is a flow diagram illustrating example operations for generating and storing steering matrices.

FIG. 4 is a flow diagram illustrating example operations for generating and storing steering matrices. The flow 400 begins at block 402.

At block 402, channel estimates are received. For instance, the channel estimates may be received at the steering matrix computation and storage unit 106 of FIG. 1. In one example, the channel estimates may be determined by the channel estimation unit 104 of FIG. 1 and provided to the steering matrix computation and storage unit 106. The number of sub-carriers that comprise a received RF signal may influence the number of channel estimates. The flow continues at block 404.

At block 404, singular value decomposition (SVD) is performed on the received channel estimates to generate steering matrices. For example, the SVD unit 204 of FIG. 2A may perform singular value decomposition on the received channel estimates. The number of steering matrices depends on the number of subcarriers that comprise a signal. For example, a signal implementing IEEE 802.11n with OFDM comprises 56 subcarriers; therefore, a system that receives the signal may generate 56 steering matrices. The order of the steering matrices may depend on the number of transmit chains and the number of space-time streams. The operations for performing SVD on a channel matrix to generate a steering matrix are described by Eq. 4 and Eq. 5.

$$H_i = U_i \Sigma_i V_i^* \qquad \text{Eq.4}$$

$$\text{Steering matrix for } i^{th} \text{ subcarrier} = V_i \qquad \text{Eq. 5}$$

In Eq. 4, $H_i$ is a channel matrix with an order of $M_{RX} \times M_{TX}$, where $M_{RX}$ is the number of receive chains and $M_{TX}$ is the number of transmit chains corresponding to the $i^{th}$ OFDM subcarrier. $U_i$ is an $M_{RX} \times M_{RX}$ unitary matrix corresponding to the $i^{th}$ subcarrier, $\Sigma_i$ is an $M_{RX} \times M_{TX}$ diagonal matrix comprising eigen values of $H_i^* H_i$, and $V_i$ is an $M_{TX} \times M_{TX}$ unitary matrix corresponding to the $i^{th}$ subcarrier. $V_i^*$ denotes a conjugate transpose of $V_i$. The columns of $V_i$ are eigenvectors of $H_i^* H_i$. After the steering matrices are determined from the channel estimates, the flow continues at block 406.

At block 406, the steering matrices are compressed, e.g., by the compression unit 206 of FIG. 2A. Any suitable technique may be used to compress the steering matrices. For example, the Givens rotation technique described by the IEEE 802.11n may be used to compress the steering matrices. According to the Givens rotation technique, a steering matrix may be represented as a pair of angles. As another example, matrix transformation operations (e.g., Cholesky transformation, LU decomposition, etc.) may be performed on the steering matrices to reduce the number of matrix elements to be stored. A fewer number of bits may be required to store a triangular or a diagonal matrix as compared to a matrix comprising only non-zero elements. The flow continues at block 408.

At block 408, the compressed steering matrices (determined at block 410) are grouped, e.g., by the grouping unit 208 of FIG. 2A. Grouping steering matrices can further reduce the number of bits required to store the steering matrices. Typically, steering matrices associated with the one or more OFDM subcarriers are very similar. To group the steering matrices, the subcarriers are sub-sampled and the compressed steering matrices associated with the sub-sampled subcarriers are stored. For example, for a grouping factor of 4 ($N_g=4$), the compressed steering matrices associated with every fourth subcarrier are stored. Thus, the number of bits required for steering matrix storage is reduced by a factor of 4. The grouping factor and the selection of subcarriers may be dependent, at least in part, on an error of transmission associated with each subcarrier. The flow continues at block 410.

At block 410, the grouped and compressed steering matrices are stored, e.g., by the steering matrix storage unit 210 of FIG. 2A. From block 410, the flow ends.

FIG. 5A is a flow diagram illustrating example operations for phase rotation by a fixed phase offset. The flow 500 begins at block 502.

At block 502, corresponding steering vectors of consecutive steering matrices are received. In other words, the same columns of steering matrices (i.e., the steering vectors) associated with consecutive sub-carriers that comprise the received RF signal are received. For example, a first sub-carrier may be associated with a first steering matrix and a second consecutive sub-carrier may be associated with a second steering matrix. The flow continues at block 504.

At block 504, it is determined (e.g., by the phase difference estimation unit 222 of FIG. 2B) whether the phase difference between the corresponding steering vectors of the consecutive steering matrices is greater than $$\frac{\pi}{2}.$$

Any suitable technique can be used to estimate the phase difference between the corresponding steering vectors of the consecutive steering matrices. With reference to the above example, where the first sub-carrier is associated with the first steering matrix and the second consecutive sub-carrier may be associated with the second steering matrix, the phase of a first steering vector (e.g., column one) of the first steering matrix may be compared against the phase of a corresponding steering vector (e.g., column one) of the second steering matrix. If it is determined that the phase difference between the corresponding steering vectors of the consecutive steering matrices is greater than $$\frac{\pi}{2},$$

the flow continues at block 506. Otherwise, the flow ends.

At block 506, one of the steering vectors is rotated by $\pi$ (e.g., by the phase rotation unit 224 of FIG. 2B). In Eq. 6, $V_{i,k}$ represents the $i^{th}$ steering vector of the $k^{th}$ steering matrix and is associated with the $k^{th}$ subcarrier. The columns of the steering matrices are rotated in accordance with Eq. 6.

$$V_{i,k}=V_{i,k}\cdot e^{-j\pi} \qquad \text{Eq. 6}$$

Rotating one of the steering vectors for better phase continuity can maximize the correlation between the steering matrices and minimize random variation of phase in the steering matrices. It should be noted that operations for phase difference estimation and phase rotation are successively performed on corresponding steering vectors of two consecutive steering matrices to establish phase continuity across the steering matrices, or at least to significantly improve phase continuity across the steering matrices. From block 506, the flow ends.

Figure 6:
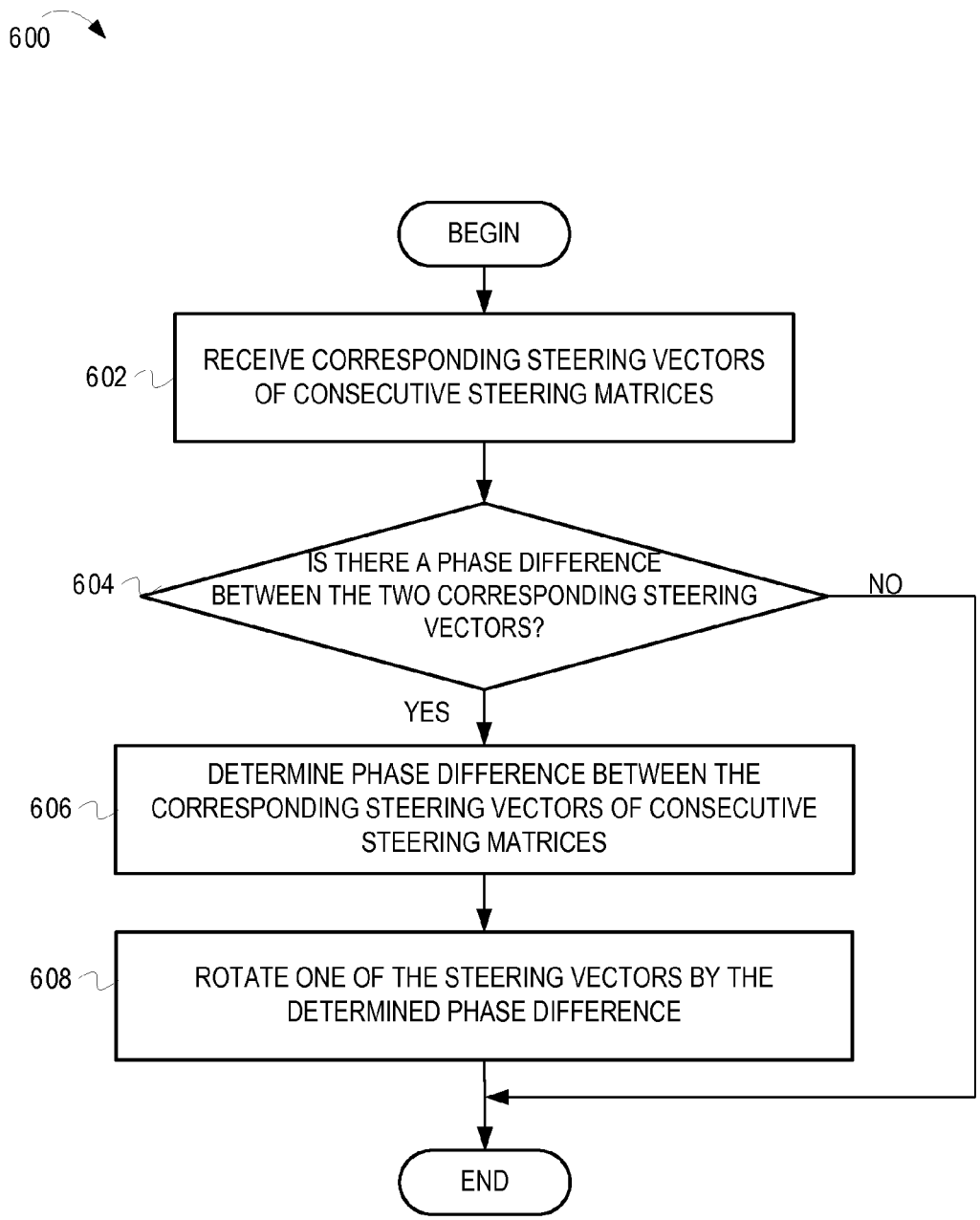
FIG. 6 is a flow diagram illustrating example operations for phase rotation by a variable phase offset.

FIG. 6 is a flow diagram illustrating example operations for phase rotation by a variable phase offset. The flow 600 begins at block 602.

At block 602, corresponding steering vectors of consecutive steering matrices are received. In other words, the same columns of steering matrices (i.e., the steering vectors) associated with consecutive sub-carriers that comprise the received RF signal are received. For example, a first sub-carrier may be associated with a first steering matrix and a second consecutive sub-carrier may be associated with a second steering matrix. The flow continues at block 604.

At block 604, it is determined (e.g., by the phase difference estimation unit 222 of FIG. 2B) whether there is a phase difference between the corresponding steering vectors of the consecutive steering matrices. A difference between the corresponding steering vectors of the consecutive steering matrices can be determined by comparing the phase of a first row in the two steering vectors. For example, if the phase of a first element in a first steering vector of a first steering matrix is equal to the phase of a first element in a corresponding first steering vector of a consecutive second steering matrix, it may be determined that there is no phase difference between the corresponding steering vectors of the consecutive steering matrices. The phase difference may also be determined by cross correlating the corresponding steering vectors of the consecutive steering matrices. If it is determined that there is a phase difference between the corresponding steering vectors of the consecutive steering matrices, the flow continues at block 606. Otherwise, the flow ends.

At block 606, the phase difference between the corresponding steering vectors of the consecutive steering matrices is determined (e.g., by the phase difference estimation unit 222 of FIG. 2B). The phase difference between the corresponding steering vectors of the consecutive steering matrices is calculated using Eq. 7.

$$\phi_{i,k}=\text{angle}(V_{i,k-1}^H V_{i,k}) \qquad \text{Eq.7}$$

In Eq. 7, $\phi_{i,k}$ is the phase difference between the steering vectors $V_{i,k-1}$ and $V_{i,k}$. The steering vector $V_{i,k}$, is the $i^{th}$ steering vector of the $k^{th}$ steering matrix and is associated with the $k^{th}$ subcarrier. The steering vector $V_{i,k-1}$, is the $i^{th}$ steering vector of the $k-1^{th}$ steering matrix and is associated with the $k-1^{th}$ subcarrier. In alternate embodiments, other suitable techniques can be used to determine the phase difference between the corresponding steering vectors of the consecutive steering matrices. The flow continues at block 608.

At block 608, one of the steering vectors is rotated (e.g., by the phase rotation unit 224 of FIG. 2B) by the determined phase difference. In Eq. 8, the phase of steering matrix $V_{i,k}$ is rotated by $\phi_{i,k}$.

$$V_{i,k}=V_{i,k}\cdot e^{-j\phi_{i,k}} \qquad \text{Eq. 8}$$

In performing the operation described by Eq. 8, the phase of correlation between the corresponding steering vectors of the consecutive steering matrices ($V_{i,k-1}$ and $V_{i,k}$) can be maximized. As described above, operations for phase difference estimation and phase rotation are successively performed on the corresponding steering vectors of the consecutive steering matrices to establish phase continuity across the steering matrices, or at least to significantly improve phase continuity across the steering matrices. From block 608, the flow ends.

Figure 7:
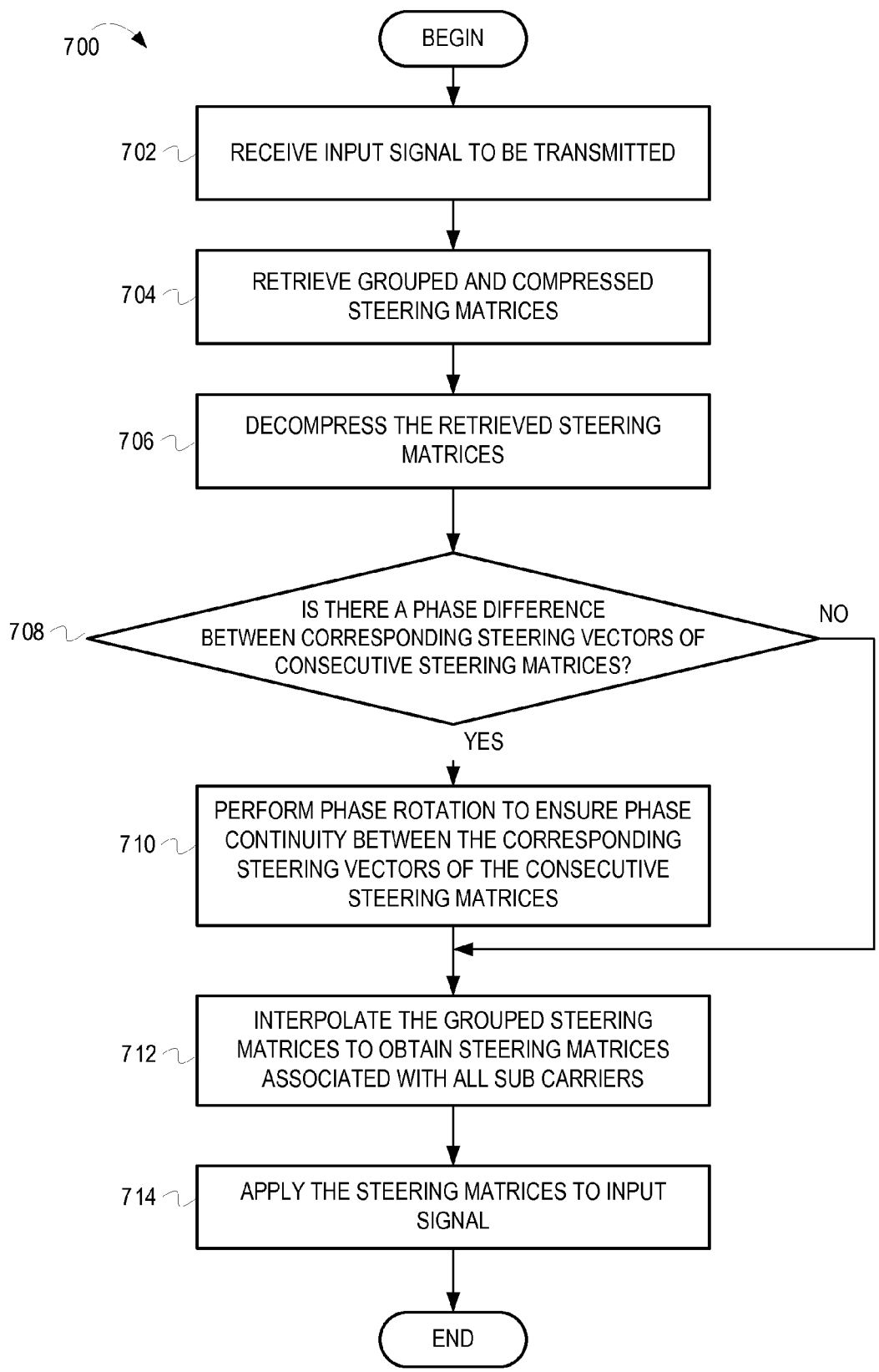
FIG. 7 is a flow diagram illustrating example operations for retrieving and applying steering matrices.

FIG. 7 is a flow diagram illustrating example operations for retrieving and applying steering matrices. The flow 700 begins at block 702.

At block 702, an input signal comprising one or more symbols to be transmitted is received. For example, the steering matrix retrieval unit 108 and/or the multipliers 112 of FIG. 1 may receive the input signal. The input signal may comprise information modulated on to one or more subcarriers depending on the modulation and coding scheme used. In other implementations, N independent unmodulated data streams may be received, where N is the number of subcarriers. The flow continues at block 704.

At block 704, grouped and compressed steering matrices are retrieved. The grouped and compressed steering matrices may be retrieved from a storage unit embodied as part of a transmitter. In one example, the steering matrices may be retrieved from the steering matrix storage unit 210 shown in FIG. 2A. Typically, the number of steering matrices is dependent on the number of sub-carriers that comprise the input signal. Also, the order of the steering matrices may be influenced by the number of space-time streams, a number of transmit chains, and a number of spatial streams that the destination device can receive. The flow continues at block 706.

At block 706, the retrieved steering matrices are decompressed (e.g., by the steering matrix decompression unit 220 of FIG. 2B). Any suitable decompression techniques corresponding to the compression techniques may be used. For example, decompression techniques may be applied to retrieve matrix elements from the Givens angles associated with the steering matrix. As another example, matrix transformation operations may be used to regenerate the steering matrices from a diagonal or triangular matrix. The flow continues at block 708.

At block 708, it is determined (e.g., by the phase difference estimation unit 222 of FIG. 2B) whether there is a phase difference between corresponding steering vectors of consecutive steering matrices. Although channel matrices associated with the OFDM subcarriers are continuous in phase, an arbitrary phase resulting from the SVD process can result in a phase difference between consecutive steering matrices. Because the SVD process does not produce unique results, it may be possible to select steering vectors that are not phase continuous. A lack of phase continuity can result in incorrect interpolation when regenerating the steering matrices from grouped and compressed steering matrices. Incorrect interpolation can further lead to incorrect steering matrices being applied to data to be transmitted. This can impair beamforming performance. Phase discontinuity or phase difference between corresponding steering vectors of the consecutive steering matrices can be determined by comparing the phase of a first row in a first steering vector with the phase of a first row in a second steering vector. The phase difference may also be determined by cross correlating the corresponding steering vectors of the consecutive steering matrices.

Figure 5B:
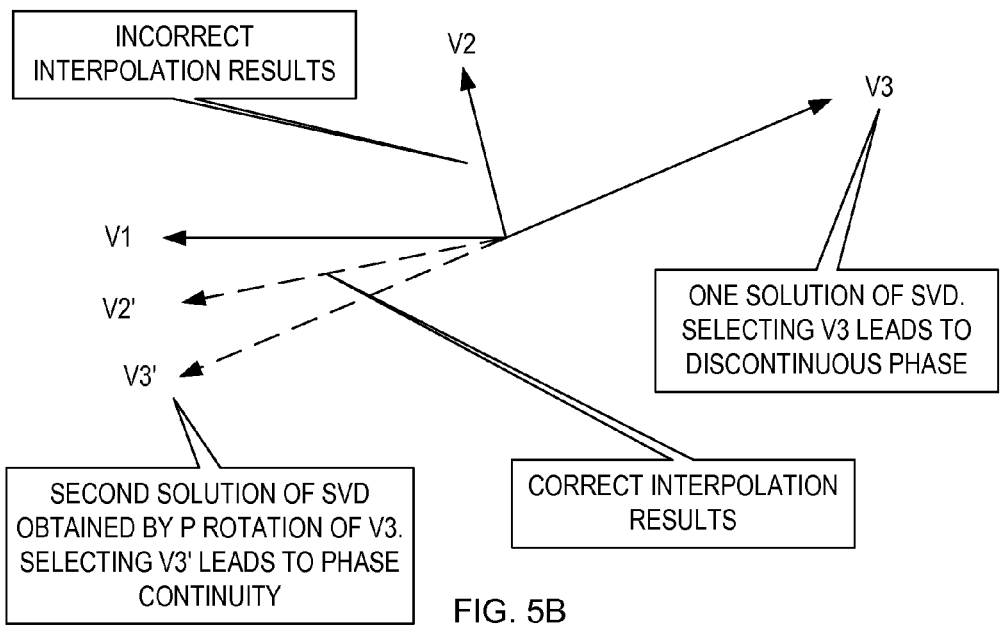
FIG. 5B is an example conceptual diagram illustrating the effects of phase discontinuity on steering matrix interpolation.

FIG. 5B is an example conceptual diagram illustrating the effects of phase discontinuity on steering matrix interpolation. Because singular value decomposition does not produce unique results, it may be possible to select eigenvectors (and steering vectors) that are not continuous in phase. In FIG. 5B, vectors V1, V2, and V3 are three consecutive steering vectors and comprise one result of performing SVD on the channel matrix (when π rotation is not performed). Vectors V1, V2', and V3' represent a second result of performing SVD on the channel matrix (when π rotation is performed). V3' is obtained by a π rotation of V3. In this example, we assume that after grouping and compression, vectors V1 and V3 are stored. Each steering vector may be associated with a random phase noise. In compressing and grouping the steering vectors, phase information associated with the steering vectors may be lost.

In FIG. 5B, vectors V1 and V3 are discontinuous in phase. Performing interpolation using V1 and V3 produces an incorrect interpolation result V2. As shown in FIG. 5B, steering vector V3 is almost 180 degree out of phase with steering vector V1. Also, interpolated steering vector V2 is orthogonal to steering vectors V1 and V3. Using V1, V2, and V3 as steering vectors for beamforming can lead to loss of signal directionality and poor beamforming performance. However, rotating V3 by π and interpolating using V1 and V3', produces a more accurate interpolation result V2'. V1, V2', and V3' are almost continuous in phase. Using steering vectors V1, V2', and V3' for beamforming can minimize the effects of random phase, enhance beamforming, and improve performance. Referring back to FIG. 7, the flow continues at block 710.

At block 710, one of the steering vectors is phase rotated (e.g., by the phase rotation unit 224 of FIG. 2B) for phase continuity between the corresponding steering vectors of the consecutive steering matrices. In some implementations, if it is determined that the phase difference between the two corresponding steering vectors of the consecutive steering matrices is greater than $$\frac{\pi}{2},$$

one of the steering vectors may be rotated by π. This technique can be used in implementations where coarse phase rotation and a slight phase difference between the corresponding steering vectors of the consecutive steering matrices are acceptable. For precise phase correction and for zero phase difference between the two corresponding steering vectors of the consecutive steering matrices, one of the steering vectors may be rotated by the phase difference between the two steering vectors. Rotating the steering vectors does not affect the beamforming directionality, as a rotated eigenvector of $(H_i^*H_i)$ is also an eigenvector of $(H_i^*H_i)$. Techniques for phase rotation can are further described in FIGS. 5A and 6. It should be noted that operations for phase difference estimation and phase rotation are performed for corresponding steering vectors for each set of consecutive steering matrices associated with the subcarriers. Phase difference estimation and phase rotation are successively performed on the corresponding steering vectors associated with each set of the consecutive steering matrices to establish phase continuity across the steering matrices, or at least to significantly improve phase continuity across the steering matrices. The flow continues at block 712.

At block 712, interpolation is performed on the decompressed steering matrices to obtain steering matrices associated with all the sub-carriers. For example, the steering matrix interpolation unit 226 of FIG. 2B may perform interpolation. During grouping operations, the subcarriers are sub-sampled and only the compressed steering vectors associated with the sub-sampled subcarriers are stored. Interpolation is used to retrieve the steering matrices that were discarded during the grouping process. In some implementations, other suitable interpolation techniques (e.g., linear interpolation, spline interpolation, etc.) can be used to determine Givens rotation angles associated with the discarded steering matrices. To interpolate the decompressed steering matrices, one or more of Givens rotation angles associated with the decompressed steering matrices, and a grouping factor may be known. The flow continues at block 714.

At block 714, the steering matrices are applied to the input signals. After the input signals are beamformed, the beamformed signals may be converted into analog signals (e.g., by an IFFT unit), further modulated (BPSK, MPSK, etc.) to generate RF signals, amplified, and transmitted. From block 714, the flow ends.

It should be understood that the depicted flow diagrams (FIGS. 4, 5A, 6-7) are examples meant to aid in understanding embodiments and should not be used to limit embodiments or limit scope of the claims. Embodiments may perform additional operations, fewer operations, operations in a different order, operations in parallel, and some operations differently. For example, in some implementations, operations to ensure phase continuity by phase rotation may be performed during steering matrix storage (FIG. 4) and also during steering matrix retrieval (FIG. 7).

Figure 8:
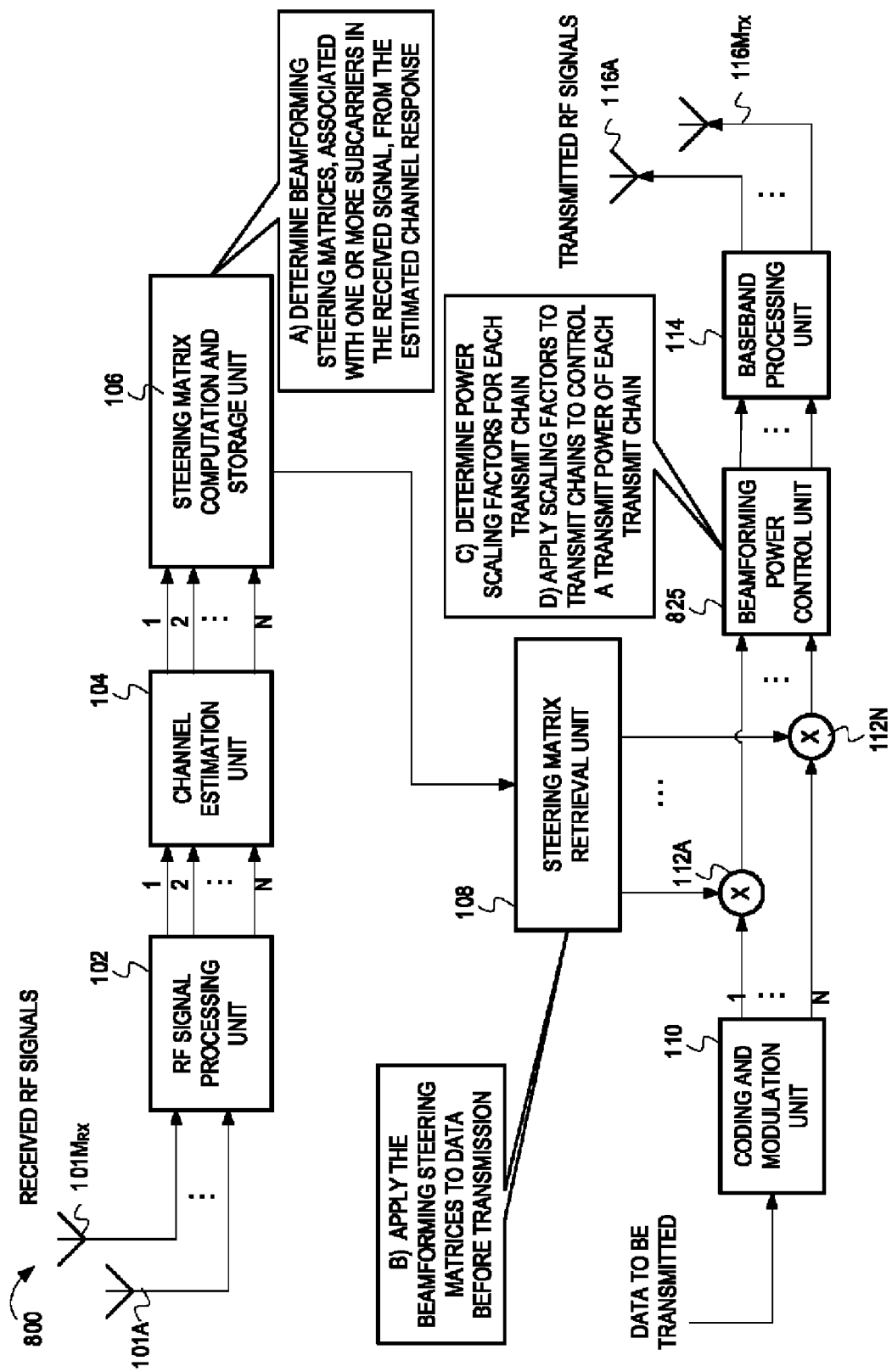
FIG. 8 is a block diagram of another embodiment of a transceiver configured to control the transmit power of each of the transmit chains of the transceiver.

FIG. 8 is a block diagram of another embodiment of the transceiver of FIG. 1. As illustrated, similar to FIG. 1, the transceiver 800 comprises receive antennas 101A . . . 101M$_{RX}$, RF signal processing unit 102, channel estimation unit 104, steering matrix computation and storage unit 106, steering matrix retrieval unit 108, coding and modulation unit 110, multipliers 112A . . . 112N, baseband processing unit 114, and transmit antennas 116A . . . 116M$_{TX}$. Furthermore, in this embodiment, the transceiver 800 includes a beamforming power control unit 825 operable to control the transmit power of the transceiver 800. In beamforming transceiver systems, even though the transmit power may be normalized prior to the beamforming operations, the transmit power may be skewed after the beamforming steering matrices are applied to the data to be transmitted by the transceiver 800. The beamforming power control unit 825 can control the in-band power transmitted on each antenna of each transmit chain to maximize the transmit power to improve performance, and at the same time ensure that the transmit power is within the power limits of the power amplifier (PA) of each transmit chain. The beamforming power control unit 825 can also ensure that the total power transmitted by the transceiver 800 meets FFC criteria, e.g., that the total power transmitted does not exceed a maximum total power limit specified by the FCC.

In various implementations, the transceiver 800 of FIG. 8 can compute and process the beamforming steering matrices by similar techniques as described above with reference to the transceiver 100 and FIGS. 1-7. For example, at Stage A, the steering matrix computation and storage unit 106 can determine the beamforming steering matrices for the subcarriers associated with a received RF signal, e.g., by performing singular value decomposition (SVD) on the estimated channel matrices (determined by the channel estimation unit 104). Also, in one implementation, the steering matrix computation and storage unit 106 can compress and/or group the beamforming steering matrices prior to storage. At stage B, the steering matrix retrieval unit 108 can apply the beamforming steering matrices to the data to be transmitted, e.g., via the multipliers 112. It is noted, however, that in other embodiments the transceiver 800 may process the beamforming steering matrices by other techniques, e.g., without performing compression and/or grouping operations before storage, in conjunction with the beamforming power control operations described below.

At stage C, the beamforming power control unit 825 determines a power scaling factor for each of the transmit chains of the transceiver 800, which will be used to control the transmit power of each transmit chain. In one embodiment, the beamforming power control unit 825 determines a power scaling factor for each of the transmit chains based, at least in part, on the maximum transmit power associated with each transmit chain, as will be described further below with reference to FIGS. 9-11.

At stage D, the beamforming power control unit 825 applies the power scaling factors to the transmit chains to control the transmit power of each transmit chain. In some implementations, the beamforming power control unit 825 applies a different scaling factor to each of the transmit chains to transmit the maximum power. In these implementation, the beamforming power control unit 825 applies each of the computed power scaling factors to a corresponding transmit chain to set the transmit power associated with each chain to approximately the maximum transmit power. In some cases, applying a different scaling factor to each transmit chain may distort the beamforming direction associated with the beamforming steering matrices of each transmit chain. However, in some implementations, transmitting at the maximum transmit power can result in improved transceiver performance even though the beamforming direction is changed.

In other implementation, the beamforming power control unit 825 applies a common scaling factor to all the transmit chains to maintain the beamforming direction. In one example, the beamforming power control unit 825 applies the minimum power scaling factor from the plurality of computed power scaling factors to all the transmit chains. In these implementations, some transmit chains of the transceiver 800 may transmit at slightly less than the maximum transmit power and other transmit chains may transmit at approximately the maximum transmit power. In these cases, transceiver performance can still be improved by transmitting at a level close to the maximum transmit power with most of the transmit chains, and also maintaining the beamforming direction.

It is noted that transmitting at approximately the maximum transmit power may be defined to mean transmitting at the maximum transmit power with some potential variance due to error. In some implementations, transmitting at approximately the maximum transmit power may be defined to mean transmitting at the maximum transmit power±0.5%. In other implementations, transmitting at approximately the maximum transmit power may be defined to mean transmitting at the maximum transmit power±1.0%. It is noted, however, that in yet other implementations transmitting at approximately the maximum transmit power may be defined to mean transmitting at the maximum transmit power±a different percentage variance due to error, e.g. ±2% or ±3%.

Figure 9:
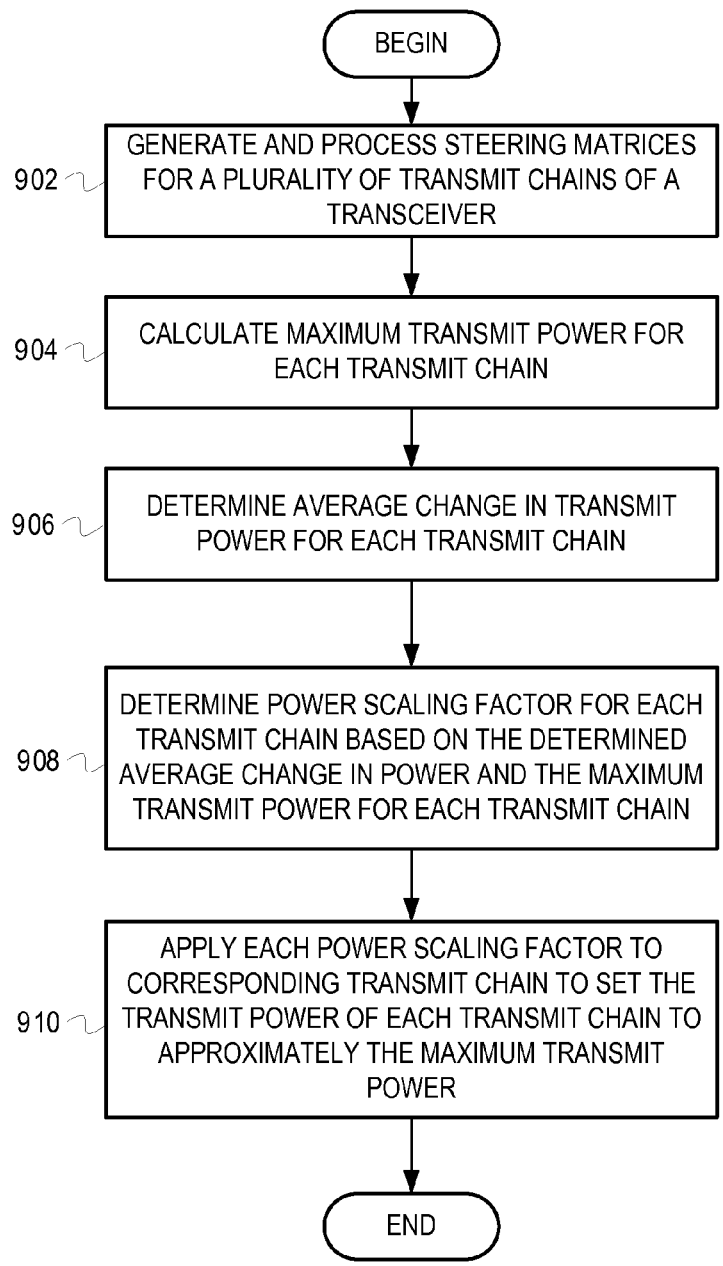
FIG. 9 is a flow diagram illustrating one example of a method for controlling the transmit power of each of the transmit chains of a transceiver.

FIG. 9 is a flow diagram illustrating example operations for controlling the transmit power associated with the plurality of transmit chains of the transceiver 800. The flow 900 begins at block 902.

At block 902, the beamforming steering matrices V are generated and processed for each of the plurality of transmit chains of the transceiver 800. For example, the steering matrix computation and storage unit 106 generates the beamforming steering matrices. The steering matrix computation and storage unit 106 may also compress, group, and store the beamforming steering matrices, as was previously described above.

At block 904, the maximum transmit power for each of the plurality of transmit chains is calculated. In one implementation, the beamforming power control unit 825 calculates the maximum transmit power ($P_{max}$) for each transmit chain based on a maximum total power limit ($P_{total}$) associated with the transceiver 800. In one example, the maximum total power limit ($P_{total}$) can be a power limit specified by the FCC for transmitters operating in certain frequency bands. For example, as shown in Eq. 9, $P_{max}$ can be calculated by dividing $P_{total}$ by the number of transmit chains ($M_{TX}$) (which is also the number of transmit antennas).

$$P_{max} = \frac{P_{total}}{M_{TX}} \quad \text{Eq. 9}$$

In another example, assuming the power limits of the power amplifiers (PAs) in the transmit chains are the same, the maximum total power limit ($P_{total}$) can be the sum of the power limits of the PAs, as long as the $P_{total}$ calculated from the PAs is less than the FCC specified limit. In other words, in this example, $P_{max}$ is approximately equal to the PA power limit. It is noted that in some implementations the beamforming power control unit 825 may perform both calculations and select the highest $P_{max}$ that is within both the PA and FCC limits.

At block 906, the average change in transmit power in each transmit chain, resulting from applying the beamforming steering matrices to the data associated with the subcarriers of the received RF signal, is determined based on the beamforming steering matrices associated with each transmit chain. For example, the beamforming power control unit 825 determines the average change in transmit power in each transmit chain. In one implementation, the average change in transmit power ($p_i$) associated with each transmit chain can be computed as shown in Eq. 10. In Eq. 10, $v_{i,j,k}$ are the $(i, j)^{th}$ entries of each beamforming steering matrix $V_k$ corresponding to each of the k subcarriers associated with each transmit chain. N is the number of spatial streams being transmitted by the transceiver 800 (which also corresponds to the number of columns in the beamforming steering matrices).

$$p_i = \text{mean}\left[\sum_{j=1}^{N} \frac{|v_{i,j,k}|^2}{N}\right] \quad \text{Eq. 10}$$

At block 908, the power scaling factors for each of the transmit chains are determined. In one example, the beamforming power control unit 825 calculates the power scaling factors for each transit chain based on the computed change in transmit power ($p_i$) and the maximum transmit power ($P_{max}$) for each transmit chain. As shown in Eq. 11, in one implementation, each power scaling factor ($r_i$) for each transmit chain is computed by taking the square root of $P_{max}$ divided by $p_i$.

$$r_i = \sqrt{\frac{P_{max}}{p_i}} \quad \text{Eq. 11}$$

If the transceiver 800 includes M transmit chains, the beamforming power control unit 825 computes M power scaling factors based on Eq. 11, i.e., the beamforming power control unit 825 computes power scaling factors $r_1, r_2, \ldots, r_M$. In one example, if transceiver 800 comprises 4 transmit chains, the beamforming power control unit 825 computes power scaling factor $r_1$ for a first transmit chain, power scaling factor $r_2$ for a second transmit chain, power scaling factor $r_3$ for a third transmit chain, and power scaling factor $r_4$ for a fourth transmit chain of transceiver 800.

At block 910, each of the computed power scaling factor is applied to the corresponding transmit chain to set the transmit power of each transmit chain to approximately the maximum transmit power $P_{max}$. For example, if the transceiver 800 has M transmit chains, the beamforming power control unit 825 applies the power scaling factor $r_1$ to the first transmit chain, the power scaling factor $r_2$ to the second transmit chain, . . . , and the power scaling factor $r_M$ to the $M^{th}$ transmit chain. As described above, in some implementations, the beamforming power control unit 825 is configured to apply a different scaling factor to each of the transmit chains. In these implementations, the beamforming power control unit 825 applies each of the computed power scaling factors to the corresponding transmit chain to set the transmit power of each transmit chain to approximately the maximum transmit power $P_{max}$. It is noted, however, that in some implementations, the beamforming power control unit 825 can be configured to apply a common power scaling factor to all the transmit chains, as will be further described below with reference to FIG. 10.

In some embodiments, e.g., as shown in FIG. 8, the beamforming power control unit 825 performs the power control operations described above after the beamforming steering matrices are applied (e.g., via the multipliers 112) to the data to be transmitted by the transceiver 800, but prior the baseband processing unit 114. In other words, in these embodiments, the beamforming power control unit 825 applies the computed power scaling factors to the output data streams after the beamforming steering matrices are applied to the data to be transmitted by the transceiver 800. It is noted, however, that in other implementations the beamforming power control unit 825 can perform the power control operations prior to applying the beamforming steering matrices to the data. For example, the beamforming power control unit 825 can apply the power scaling factors to the beamforming steering matrices, e.g., after the beamforming steering matrices are retrieved by the steering matrix retrieval unit 108, and prior to the multipliers 112.

Figure 10:
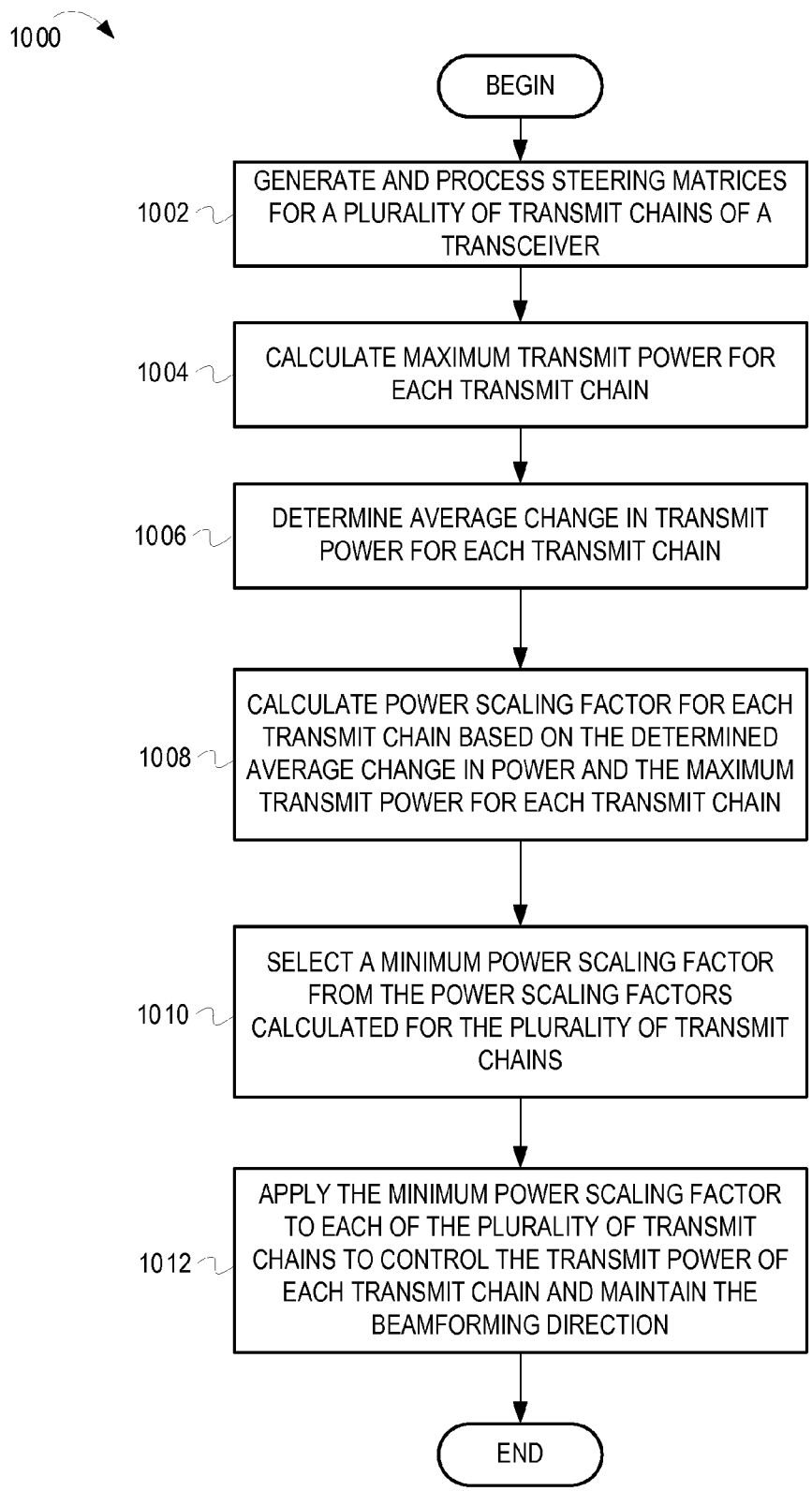
FIG. 10 is a flow diagram illustrating another example of a method for controlling the transmit power of each of the transmit chains of a transceiver.

FIG. 10 is a flow diagram illustrating example operations for controlling the transmit power associated with the plurality of transmit chains of the transceiver 800. The flow 1000 begins at block 1002.

Similar to the description of FIG. 9, at block 1002, the beamforming steering matrices are generated and processed for each of the plurality of transmit chains of the transceiver 800. At block 1004, the maximum transmit power for each of the plurality of transmit chains is calculated. At block 1006, the average change in transmit power in each transmit chain, resulting from applying the beamforming steering matrices to the data associated with the subcarriers of the received RF signal, is determined based on the beamforming steering matrices associated with each transmit chain. At block 1008, the power scaling factors for each of the transmit chains are calculated.

At block 1010, when the transceiver 800 is configured to apply a common power scaling factor to all of the transmit chains, a minimum scaling factor is selected from the power scaling factors calculated for the plurality of transmit chains. In other words, the beamforming power control unit 825 first determines a minimum power scaling factor out of the plurality of power scaling factors that were computed for the plurality of transmit chains, and then selects the minimum power scaling factor. For example, the beamforming power control unit 825 selects the minimum power scaling factor from the computed power scaling factors $r_1, r_2 \ldots r_M$.

At block 1012, the minimum power scaling factor is applied to each of the plurality of transmit chains of the transceiver 800 to control the transmit power of each transmit chain and to maintain the beamforming direction. For example, if the transceiver 800 has M transmit chains, the beamforming power control unit 825 applies the minimum power scaling factor to all M transmit chains.

In some embodiments, e.g., as shown in FIG. 8, the beamforming power control unit 825 applies the minimum power scaling factor to the output data streams associated with each transmit chain after the beamforming steering matrices are applied (e.g., via the multipliers 112) to the data to be transmitted by the transceiver 800, but prior to the baseband processing unit 114. It is noted, however, that in other implementations the beamforming power control unit 825 can apply the minimum power scaling factor to the beamforming steering matrices of each transmit chain, e.g., after the beamforming steering matrices are retrieved by the steering matrix retrieval unit 108, and prior to the multipliers 112.

Figure 11:
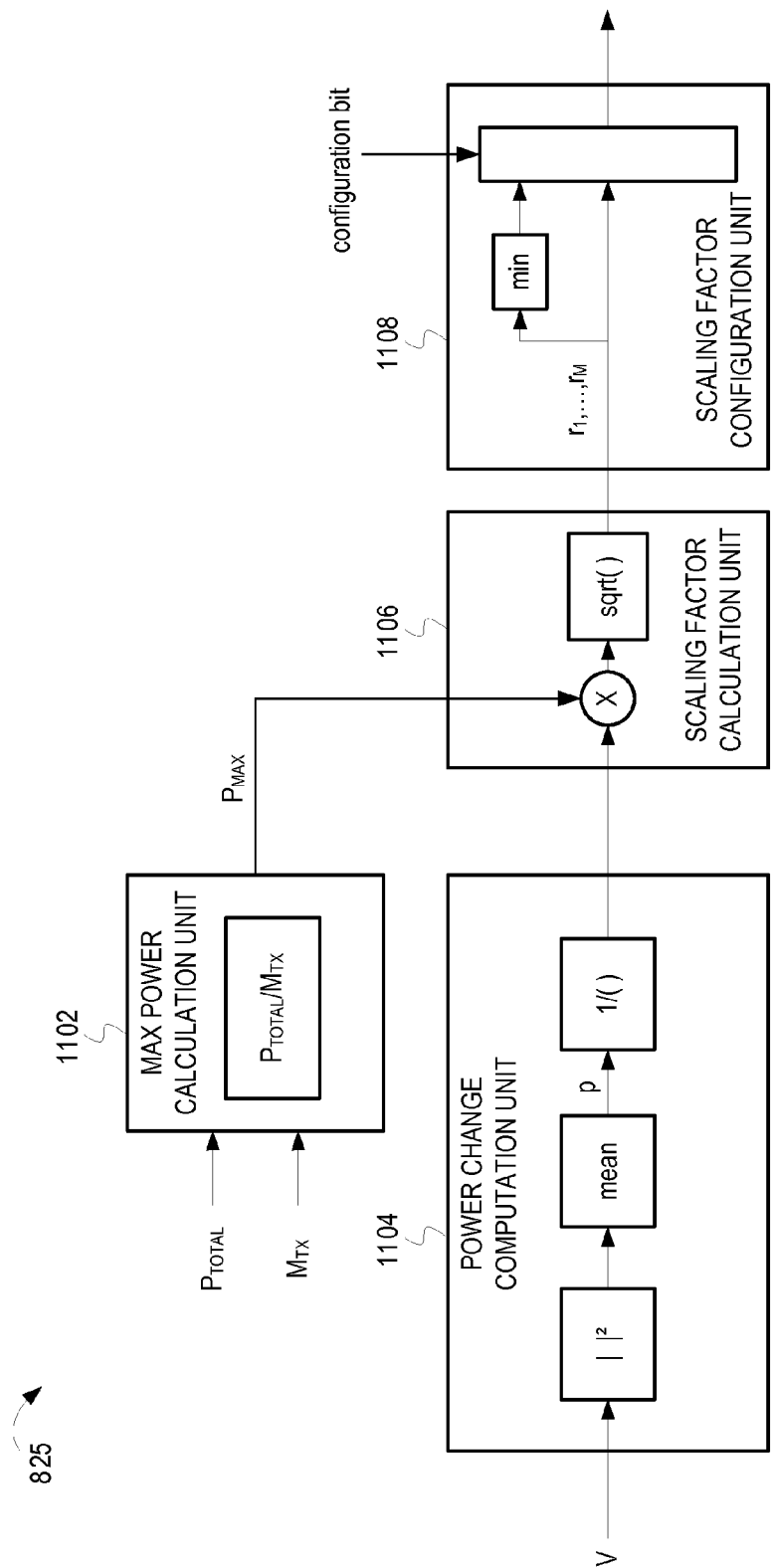
FIG. 11 is a block diagram of one embodiment of a beamforming power control unit of a transceiver.

FIG. 11 is a block diagram of one embodiment of the beamforming power control unit 825 of FIG. 8. Specifically, FIG. 11 illustrates one example technique for computing the power scaling factors for the plurality of transmit chains of the transceiver 800, which may be implemented within the beamforming power control unit 825. As illustrated, in one example, the beamforming power control unit 825 includes a max power calculation unit 1102, a power change computation unit 1104, a scaling factor calculation unit 1106, and a scaling factor configuration unit 1108. In this example, the max power calculation unit 1102 calculates the maximum transmit power $P_{max}$ by dividing $P_{total}$ by the number of transmit chains $M_{TX}$, as described above with reference to FIG. 9 and Eq. 9. The max power calculation unit 1102 then provides $P_{max}$ to the scaling factor calculation unit 1106. The power change computation unit 1104 receives the beamforming steering matrices V associated with the subcarriers of the received RF signal and calculates the average change in transmit power $(p_i)$ in each transmit chain, resulting from applying the beamforming steering matrices to the data associated with the subcarriers of the received RF signal, as described above with reference to FIG. 9 and Eq. 10. The scaling factor calculation unit 1106 calculates the power scaling factors $(r_1, r_2, \ldots, r_M)$ for the plurality of transmit chains based on the computed change in transmit power $(p_i)$ and the maximum transmit power $(P_{max})$ for each transmit chain, as described above with reference to FIG. 9 and Eq. 11.

The scaling factor configuration unit 1108 selects either different computed power scaling factors for the plurality of transmit chains or a common power scaling factor for the plurality of transmit chains depending on the configuration of the scaling factor configuration unit 1108. For example, a multiplexer or other selection mechanism of the scaling factor configuration unit 1108 can be configured (e.g., by a processor or other controlling entity of the system) via a configuration bit to select one of two paths. In the first path, the scaling factor configuration unit 1108 selects the plurality of computed power scaling factors $(r_1, r_2, \ldots, r_M)$ for the plurality of transmit chains. In the second path, the scaling factor configuration unit 1108 selects a minimum power scaling factor $(\min(r_1, r_2, \ldots, r_M))$ for all of the transmit chains.

In one embodiment, the scaling factor configuration unit 1108 can be preconfigured to implement one of the two power control options, e.g., based on the specifications of the wireless communication system. In another embodiment, the scaling factor configuration unit 1108 can be configurable to switch between the two options for selecting power scaling factors as the specifications of the wireless communication system changes, e.g., the transceiver 800 may include a detection mechanism to detect the system specifications. In one specific example, when the transceiver 800 has a relatively small number of transmit chains (and antennas), e.g., one or two transmit chains, the scaling factor configuration unit 1108 can be configured to select the different computed power scaling factors, in order to maximize the transmit power. Otherwise, the scaling factor configuration unit 1108 can be configured to select a common power scaling factor to set the transmit power at a level close to the maximum transmit power for most of the transmit chains and maintain the beamforming direction.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 12:
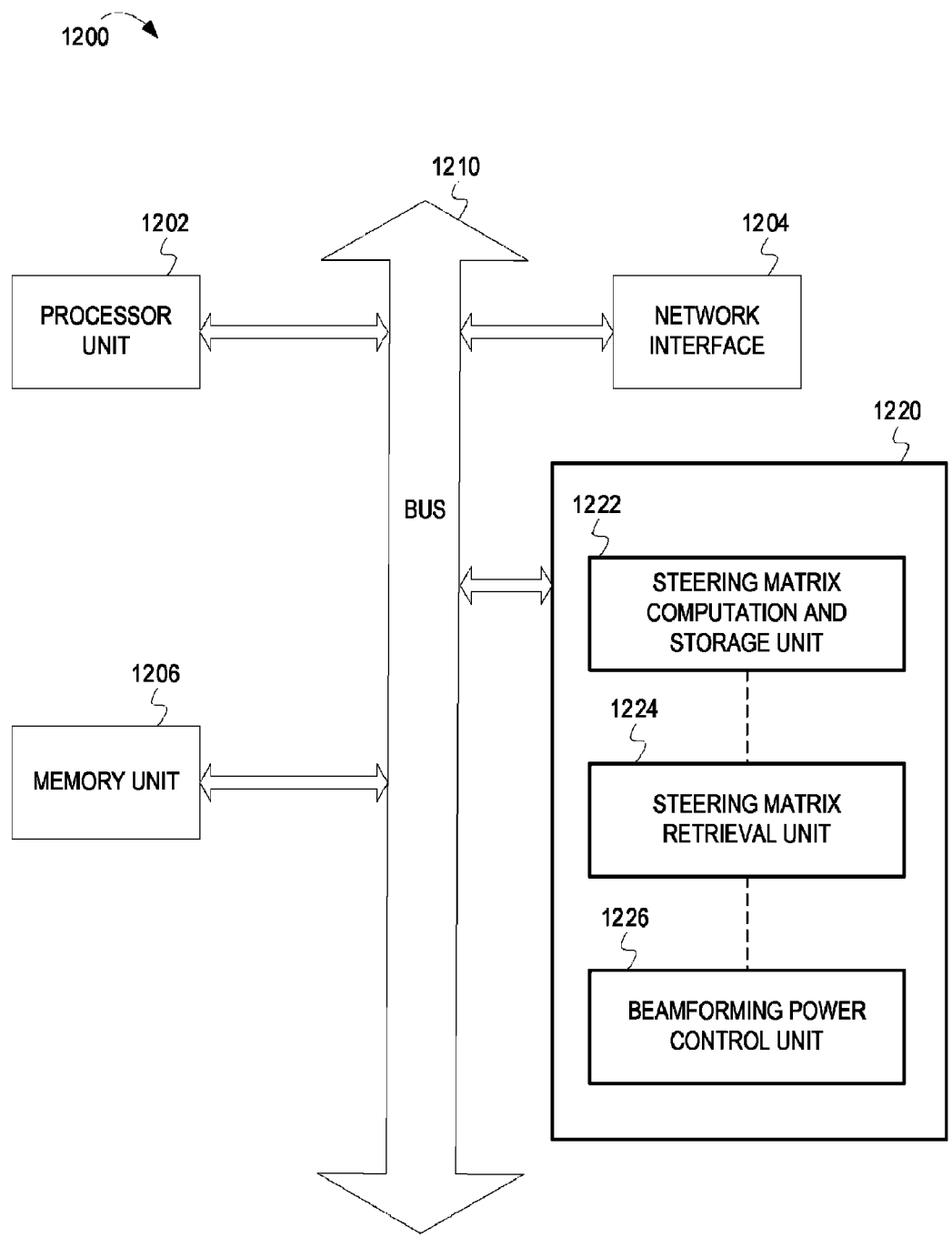
FIG. 12 is a block diagram of a wireless device.

FIG. 12 is a block diagram of a wireless device of a wireless communication system. In one implementation, the wireless device 1200 may be a WLAN device. The WLAN device includes a processor unit 1202 (possibly including multiple processors, multiple cores, multiple nodes, and/or implementing multi-threading, etc.). The WLAN device includes a memory unit 1206. The memory unit 1206 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The WLAN device also includes a bus 1210 (e.g., PCI, ISA, PCI-Express, HyperTransport®, InfiniBand®, NuBus, etc.), and network interfaces 1204 that include one or more of a wireless network interface (e.g., a WLAN interface, a Bluetooth® interface, a WiMAX interface, a ZigBee® interface, a Wireless USB interface, etc.) and a wired network interface (e.g., an Ethernet interface).

The WLAN device also includes a transceiver unit 1220. In one implementation, the transceiver unit 1220 comprises a steering matrix computation and storage unit 1222 coupled with a steering matrix retrieval unit 1224. The steering matrix computation and storage unit 1222 and the steering matrix retrieval unit 1224 comprise functionality to determine and apply steering matrices for beamforming in accordance with FIGS. 1-7. The steering matrix computation and storage unit 1222 determines steering matrices associated with the one or more subcarriers that comprise a signal. Additionally, the steering matrix computation and storage unit 1222 also compresses, groups, and stores the steering matrices. The steering matrix retrieval unit 1224 retrieves the grouped and compressed steering matrices, decompresses, and interpolates the retrieved steering matrices to obtain the steering matrices associated with each of the subcarriers. The steering matrix retrieval unit 1224 ensures and establishes phase continuity between corresponding steering vectors of consecutive steering matrices before the steering matrices are applied to individual data streams. The steering matrices are then applied to the individual data streams, modulated, and transmitted. In another embodiment, the transceiver unit 1220 further includes a beamforming power control unit 1226 configured to control the transmit power associated with a plurality of transmit chains of the transceiver unit 1220, as was described above with reference to FIGS. 8-11.

Any one of the above-described functionalities may be partially (or entirely) implemented in hardware and/or on the processing unit 1202. For example, the functionality may be implemented with an application specific integrated circuit, in logic implemented in the processing unit 1202, in a co-processor on a peripheral device or card, etc. Further, realizations may include fewer or additional components not illustrated in FIG. 12 (e.g., additional network interfaces, peripheral devices, etc.). The processor unit 1202 and the network interfaces 1204 are coupled to the bus 1210. Although illustrated as being coupled to the bus 1210, the memory 1206 may be coupled to the processor unit 1202

While the embodiments are described with reference to various implementations and exploitations, it will be understood that these embodiments are illustrative and that the scope of the inventive subject matter is not limited to them. In general, techniques for processing and storing beamforming steering matrices, and techniques for controlling transmit power in a beamforming transceiver as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
decompressing, at a transceiver system, a plurality of stored beamforming steering matrices, wherein the beamforming steering matrices are associated with a plurality of subcarriers of an RF signal received at the transceiver system;
determining, at the transceiver system, a phase difference between corresponding beamforming steering vectors of each pair of consecutive beamforming steering matrices of the plurality of beamforming steering matrices;
performing, at the transceiver system, phase rotation on the corresponding beamforming steering vectors of each pair of consecutive beamforming steering matrices based on the determined phase difference associated with the corresponding beamforming steering vectors of each pair of consecutive beamforming steering matrices to improve phase continuity between consecutive beamforming steering matrices;
interpolating, at the transceiver system, the beamforming steering matrices to ungroup the beamforming steering matrices; and
applying, at the transceiver system, the beamforming steering matrices to data to be transmitted by the transceiver system to generate beamformed data streams.

2. The method of claim 1, further comprising:
determining whether a phase difference between the corresponding beamforming steering vectors of each pair of consecutive beamforming steering matrices is greater than $$\frac{\pi}{2};$$

and
performing phase rotation on the corresponding beamforming steering vectors of each pair of consecutive beamforming steering matrices with a phase difference that is greater than $$\frac{\pi}{2}$$

to improve phase continuity, wherein said performing phase rotation comprises rotating by π one steering vector of the corresponding beamforming steering vectors of each pair of consecutive beamforming steering matrices with a phase difference that is greater than $$\frac{\pi}{2}.$$

3. The method of claim 1, further comprising:
determining that the corresponding beamforming steering vectors of one or more pairs of consecutive beamforming steering matrices have a phase difference between the corresponding beamforming steering vectors; and
rotating, by the determined phase difference, one of the corresponding beamforming steering vectors of each of the one or more pairs of consecutive beamforming steering matrices.

4. The method of claim 1, further comprising:
generating the plurality of beamforming steering matrices associated with the plurality of subcarriers of the RF signal received at the transceiver system;
compressing the beamforming steering matrices; and
storing the beamforming steering matrices.

5. The method of claim 4, further comprising grouping the beamforming steering matrices prior to storing the beamforming steering matrices.

6. The method of claim 4, further comprising determining channel estimates for the plurality of subcarriers of the received RF signal.

7. The method of claim 6, further comprising performing singular value decomposition (SVD) on the channel estimates associated with the subcarriers of the received RF signal to generate the plurality of beamforming steering matrices.

8. The method of claim 4, wherein said generating the plurality of beamforming steering matrices comprises generating a beamforming steering matrix for each of the plurality of subcarriers associated with the received RF signal.

9. A transceiver comprising:
a steering matrix decompression unit operable to decompress a plurality of stored beamforming steering matrices, wherein the beamforming steering matrices are associated with a plurality of subcarriers of an RF signal received at the transceiver;
a phase estimation unit operable to determine a phase difference between corresponding beamforming steering vectors of each pair of consecutive beamforming steering matrices of the plurality of beamforming steering matrices;
a phase rotation unit operable to perform phase rotation on the corresponding beamforming steering vectors of each pair of consecutive beamforming steering matrices based on the determined phase difference associated with the corresponding beamforming steering vectors of each pair of consecutive beamforming steering matrices to improve phase continuity between consecutive beamforming steering matrices;
an interpolation unit operable to interpolate the beamforming steering matrices to ungroup the beamforming steering matrices; and
a beamforming processing unit operable to apply the beamforming steering matrices to data to be transmitted by the transceiver to generate beamformed data streams.

10. The transceiver of claim 9, wherein:
the phase estimation unit is operable to determine whether a phase difference between the corresponding beamforming steering vectors of each pair of consecutive beamforming steering matrices is greater than $$\frac{\pi}{2};$$

and
the phase rotation unit is operable to rotate by $\pi$ one steering vector of the corresponding beamforming steering vectors of each pair of consecutive beamforming steering matrices with a phase difference that is greater than $$\frac{\pi}{2}$$

to improve phase continuity.

11. The transceiver of claim 9, wherein:
the phase estimation unit is operable to determine that the corresponding beamforming steering vectors of one or more pairs of consecutive beamforming steering matrices have a phase difference between the corresponding beamforming steering vectors; and
the phase rotation unit is operable to rotate, by the determined phase difference, one of the corresponding steering vectors of each of the one or more pairs of consecutive beamforming steering matrices.

12. The transceiver of claim 9, further comprising:
a steering matrix computation unit operable to generate the plurality of beamforming steering matrices associated with the plurality of subcarriers of the RF signal received at the transceiver;
a compression unit operable to compress the beamforming steering matrices; and
a storage unit operable to store the beamforming steering matrices.

13. The transceiver of claim 12, further comprising a grouping unit operable to group the beamforming steering matrices prior to the storage unit storing the beamforming steering matrices.

14. The transceiver of claim 12, further comprising a channel estimation unit operable to determine channel estimates for the plurality of subcarriers of the received RF signal.

15. The transceiver of claim 14, further comprising a singular value decomposition (SVD) unit operable to perform SVD on the channel estimates associated with the subcarriers of the received RF signal to generate the plurality of beamforming steering matrices.

16. One or more machine-readable storage media having stored therein a program product, which when executed by one or more processor units causes the one or more processor units to perform operations that comprise:
decompressing, at a transceiver system, a plurality of stored beamforming steering matrices, wherein the beamforming steering matrices are associated with a plurality of subcarriers of an RF signal received at the transceiver system;
determining, at the transceiver system, a phase difference between corresponding beamforming steering vectors of each pair of consecutive beamforming steering matrices of the plurality of beamforming steering matrices;
performing, at the transceiver system, phase rotation on the corresponding beamforming steering vectors of each pair of consecutive beamforming steering matrices based on the determined phase difference associated with the corresponding beamforming steering vectors of each pair of consecutive beamforming steering matrices to improve phase continuity between consecutive beamforming steering matrices;
interpolating, at the transceiver system, the beamforming steering matrices to ungroup the beamforming steering matrices; and applying, at the transceiver system, the beamforming steering matrices to data to be transmitted by the transceiver system to generate beamformed data streams.

17. The machine-readable storage media of claim 16, wherein the operations further comprise:

determining whether a phase difference between the corresponding beamforming steering vectors of each pair of consecutive beamforming steering matrices is greater than $$\frac{\pi}{2};$$

and performing phase rotation on the corresponding beamforming steering vectors of each pair of consecutive beamforming steering matrices with a phase difference that is greater than $$\frac{\pi}{2}$$

to improve phase continuity, wherein said performing phase rotation comprises rotating by $\pi$ one steering vector of the corresponding beamforming steering vectors of each pair of consecutive beamforming steering matrices with a phase difference that is greater than $$\frac{\pi}{2}.$$

18. The machine-readable storage media of claim 16, wherein the operations further comprise:

determining that the corresponding beamforming steering vectors of one or more pairs of consecutive beamforming steering matrices have a phase difference between the corresponding beamforming steering vectors; and rotating, by the determined phase difference, one of the corresponding beamforming steering vectors of each of the one or more pairs of consecutive beamforming steering matrices.

19. The machine-readable storage media of claim 16, wherein the operations further comprise:

generating the plurality of beamforming steering matrices associated with the plurality of subcarriers of the RF signal received at the transceiver system;

compressing the beamforming steering matrices; and storing the beamforming steering matrices.

20. The machine-readable storage media of claim 19, wherein the operations further comprise grouping the beamforming steering matrices prior to storing the beamforming steering matrices.

21. The machine-readable storage media of claim 19, wherein the operations further comprise determining channel estimates for the plurality of subcarriers of the received RF signal.

22. The machine-readable storage media of claim 21, wherein the operations further comprise performing singular value decomposition (SVD) on the channel estimates associated with the subcarriers of the received RF signal to generate the plurality of beamforming steering matrices.

\* \* \* \* \*